(12) United States Patent
Hiraiwa et al.

(10) Patent No.: US 8,916,033 B2
(45) Date of Patent: Dec. 23, 2014

(54) GAS DECOMPOSITION APPARATUS

(75) Inventors: Chihiro Hiraiwa, Osaka (JP); Masatoshi Majima, Osaka (JP); Koji Nitta, Osaka (JP); Atsushi Fukunaga, Osaka (JP); Shigeki Egashira, Osaka (JP)

(73) Assignee: Sumitomo Electric Industries, Ltd., Osaka (JP)

(*) Notice: Subject to any disclaimer, the term of this patent is extended or adjusted under 35 U.S.C. 154(b) by 246 days.

(21) Appl. No.: 13/510,846

(22) PCT Filed: Nov. 4, 2010

(86) PCT No.: PCT/JP2010/069565
§ 371 (c)(1),
(2), (4) Date: May 18, 2012

(87) PCT Pub. No.: WO2011/062060
PCT Pub. Date: May 26, 2011

(65) Prior Publication Data
US 2012/0228126 A1    Sep. 13, 2012

(30) Foreign Application Priority Data

Nov. 18, 2009 (JP) .................. 2009-263126
Nov. 18, 2009 (JP) .................. 2009-263140

(51) Int. Cl.
*B01D 53/32* (2006.01)
*C25B 9/08* (2006.01)
*F01N 3/01* (2006.01)
*F01N 3/08* (2006.01)

(52) U.S. Cl.
CPC .. *F01N 3/08* (2013.01); *F01N 3/01* (2013.01); *B01D 2257/404* (2013.01); *B01D 53/326* (2013.01); *B01D 2258/012* (2013.01); *Y02T 10/20* (2013.01)
USPC .............. 204/252; 205/765; 205/555; 60/275

(58) Field of Classification Search
CPC .................................................... B01D 53/925
See application file for complete search history.

(56) References Cited

U.S. PATENT DOCUMENTS 5,306,411 A * 4/1994 Mazanec et al. .............. 204/265
6,025,084 A * 2/2000 Kawasaki et al. ............. 429/456
(Continued)

FOREIGN PATENT DOCUMENTS

JP    H05-301048 A    11/1993
JP    08-066621 A  *  3/1996
(Continued)

OTHER PUBLICATIONS

Advanced Industrial Science and Technology (AIST), "Electrochemical NOx Decomposition Apparatus", issued a press release on May 20, 2003, pp. 1-5.
(Continued)

*Primary Examiner* — Harry D Wilkins, III
(74) *Attorney, Agent, or Firm* — Ditthavong & Steiner, P.C.

(57) ABSTRACT

A gas decomposition apparatus having any one of the following structures: 1) a structure wherein an anode and a cathode on a solid electrolyte layer each have extended regions; the extended regions of the anode and those of the cathode are alternately extended to have a gap between the anode and the cathode; the cathode is higher in electric resistance than the anode; and a cathode electroconductive region connected electroconductively to a power source and made of an electroconductive material is extended in a direction crossing the direction in which the extended regions of the cathode are extended, thereby connecting the extended regions of the cathode electroconductively to each other; and (2) a structure which has an electroconductor layer through which the negative electrode of a power source is electroconductively connected to a cathode; and which is a structure wherein the cathode is laminated on the electroconductor layer to contact the layer, laminates each composed of a solid electrolyte layer and an anode are positioned on the cathode to have a gap between any adjacent two of the laminates, and the anodes are electroconductively connected to the positive electrode of the power source.

13 Claims, 19 Drawing Sheets

(56) References Cited

U.S. PATENT DOCUMENTS

| | | | |
|---|---|---|---|
| 6,331,232 B1 * | 12/2001 | Lundgren et al. | 204/265 |
| 6,878,354 B1 * | 4/2005 | Mitsuda et al. | 422/211 |
| 6,887,361 B1 * | 5/2005 | Visco et al. | 204/491 |
| 7,097,817 B2 * | 8/2006 | Brisley et al. | 423/245.3 |
| 8,182,658 B2 * | 5/2012 | Koide et al. | 204/252 |
| 8,465,631 B2 * | 6/2013 | Vernoux et al. | 204/265 |
| 8,647,482 B2 * | 2/2014 | Huang | 204/262 |
| 2005/0230269 A1 * | 10/2005 | Machida et al. | 205/763 |
| 2009/0173623 A1 * | 7/2009 | Kato | 204/270 |

FOREIGN PATENT DOCUMENTS

| | | |
|---|---|---|
| JP | 08-105317 A | 4/1996 |
| JP | 08-105317 A | 4/1996 |
| JP | H08-168673 A | 7/1996 |
| JP | 09-087880 A | 3/1997 |
| JP | 09-87880 A | 3/1997 |
| JP | 2000-140566 A | 5/2000 |
| JP | 2000-140566 A | 5/2000 |
| JP | 2001-070755 A | 3/2001 |
| JP | 2003-047827 A | 2/2003 |
| JP | 2003-047827 A | 2/2003 |
| JP | 2003-181246 A * | 7/2003 |
| JP | 2003-265931 A * | 9/2003 |
| JP | 2009-150299 A | 7/2009 |
| JP | 2009-150299 A | 7/2009 |

OTHER PUBLICATIONS

Hirata, et al., "Urea Selective Reduction System of Large Diesel Automobile", The Urea-SCR System for Heavy-Duty Commercial Vehicles, vol. 60, No. 9, 2006, pp. 28-33.

Office Action for corresponding Japanese Patent Application No. 2009-263126, mailed on May 28, 2013, 9 pgs.

International Search Report for PCT Application No. PCT/JP2010/069565 dated Feb. 1, 2011, pp. 1-2.

Chinese Office Action for corresponding Chinese Application No. 201080052203.5 dated Jan. 30, 2014, 11 pages.

* cited by examiner

GAS DECOMPOSITION APPARATUS

TECHNICAL FIELD

The present invention relates to a gas decomposition apparatus, more specifically a gas decomposition apparatus capable of decomposing a gas with a good energy efficiency.

BACKGROUND ART

In nations where importance is attached to diesel engine automobiles, it is necessary to clear a strict exhaust gas regulation. Thus, various catalyst apparatuses have been developed for decreasing exhaust gases from a diesel engine. Of these catalyst apparatuses, urea selective reduction systems are recommended as apparatuses for reducing NOx to be clarified into nitrogen and water in the range of temperatures at which the speed of their engine is low (Non-Patent Literature 1).

Moreover, suggested is a method of mixing a NOx reducing catalyst, an oxidizing catalyst for hydrocarbons, and an ion electroconductive solid electrolyte with each other and then arranging the mixture to be dispersed on the surface of a metallic honeycomb, thereby decomposing NOx electrochemically (Patent Literature 1). In this invention, as the metallic honeycomb, supplied is a honeycomb structure or a stacked structure similar thereto that is obtained by stacking a stainless steel waved plate, which is worked into a wave form, and a stainless steel flat plate onto each other (Patent Literature 2, and Non-Patent Literature 2).

Suggested is also a method of applying a voltage of an anode and a cathode between which a solid electrolyte (SE) layer in order to promote the decomposition of NOx by electrochemical reaction (Patent Literature 3).

CITATION LIST

Patent Literatures

Patent Literature 1: JP-A (Japanese Patent Application Laid-Open) No. 2001-070755
Patent Literature 2: JP-A No. 05-301048
Patent Literature 3: JP-A No. 8-168673

Non-Patent Literatures

Non-Patent Literature 1: Kiminobu Hirata et al., "Urea Selective Reduction System of Large Diesel Automobile", Automotive Technology, vol. 60, No. 9, 2006, pp. 28-33
"Electrochemical NOx Decomposition Apparatus", The National Institute of Advanced Industrial Science and Technology, press-released on May 20, 2003

SUMMARY OF INVENTION

Technical Problem

About each of the urea selective reduction apparatuses for decomposing NOx, a urea selective reduction apparatus which is considerably large-scale for an automobile is arranged in its exhaust system; thus, the weight of the whole is increased. Naturally, any apparatus for automobiles is intensely required to be small in size, and light.

In the method of arranging a NOx reducing catalyst and the others to be dispersed on the surface of a metallic honeycomb, the metallic honeycomb is thin to result in an advantage that the loss of pressure is considerably decreased. However, the density of sites for electrochemical reaction is not improved very much. Moreover, the decrease in the pressure loss is also insufficient. In short, these techniques are each insufficient for promoting both of a decrease in the size of the apparatus concerned and the decomposition efficiency thereof.

The method using electrochemical reaction has an advantage that the apparatus concerned is not required to be made in a large-scale form. However, as far as the temperature of the solid electrolyte therefor, which has a predetermined thickness, is not set into a high temperature range of about 800 to 950° C., a practical ion conductivity is not obtained. At temperatures lower than the range, a sufficient NOx decomposition rate cannot be obtained.

Against any electrochemical reaction wherein solid electrodes and a solid electrolyte are used, besides the above-mentioned problem, there is caused a problem that the solid electrodes, in particular, the cathode is large in electric resistance. Because of this large electric resistance of the cathode, the electric power not used for gas decomposition is largely consumed. Thus, an improvement is desired.

Thus, a first object of the present invention is to provide a gas decomposition apparatus for decomposing a predetermined gas by use of electrochemical reaction, wherein power consumption can be prevented in solid electrodes, in particular, an electrode higher in electric resistance out of the electrodes, and further an improvement can be made in the rate of the gas decomposition.

The above-mentioned solid electrolyte has a drawback of being small in mechanical strength to be easily broken.

Thus, a second object of the invention is to provide a gas decomposition apparatus, for decomposing a predetermined gas by use of electrochemical reaction, that is not easily broken and can make an improvement in the rate of the gas decomposition.

Solution to Problem

<Gas Decomposition Apparatus for the First Object>

The gas decomposition apparatus of the invention comprises a first electrode, a second electrode paired with the first electrode, a solid electrolyte layer, and a power source for applying a voltage to the first and second electrodes across the electrodes. In this gas decomposition apparatus, the first and second electrodes each have extended regions positioned on the solid electrolyte layer to contact the solid electrolyte layer, and the extended regions of the first electrode and those of the second electrode are alternately extended to sandwich a gap between the first and second electrodes, the second electrode is higher in electric resistance than the first electrode, and a second electrode electroconductive region connected electroconductively to the power source and comprising an electroconductive material is extended in a direction crossing the direction in which the extended regions of the second electrode are extended, thereby connecting the extended regions of the second electrode electroconductively to each other.

For the easiness of understanding, any description in this section is applied to a case where a cathode is higher in electric resistance than an anode. In other words, the first electrode is rendered an anode, and the second electrode, which is higher in electric resistance than the first electrode, is rendered a cathode. This case is applicable to a gas decomposition apparatus for decomposing NOx. In this case, according to the above-mentioned structure, the cathode electroconductive region comprising the electroconductive material attains electroconductive connection between the extended regions of the cathode, so that a voltage drop in the cathode on the basis of the electric resistance thereof is restricted to the inside of the extended regions. In other words, the power consumption caused by the high resistance of the cathode in the electrochemical reaction is substantially restricted to "the power consumption at each of the cathode extended regions"דthe number of the cathode extended regions". Specifically, wiring for connecting the power source and the cathode electroconductively with each other on the gas decomposition apparatus is restricted to leading wires or an electroconductive region of the cathode. The cathode is arranged to be restricted into a place where the effect of gas decomposition is expressed. Thus, any region of the cathode is not arranged only for wiring. This manner makes it possible to use electric power consumed in the cathode at a region concerned directly with gas decomposition.

Moreover, sites of the anode and the cathode, which face each other and cause the electrochemical reaction, can be arranged at a high density on the solid electrolyte. The gap between the anode and the cathode can be made narrow in the scope of the precision of the apparatus, so that the period when the shift of oxygen ions or others between the anode and the cathode can be made short. Thus, even when the temperature of the apparatus is not made higher than in the prior art, the gas decomposition rate can be improved. As a result, the gas decomposition can be attained at a practical level. When the temperature is made equivalent to that in the prior art, the gas decomposition rate can be largely improved.

Furthermore, for the solid electrolyte, which is brittle, there is generated a margin for making use of the rear surface or some other of the solid electrolyte layer to reinforce the layer. By applying the reinforcement onto the rear surface or the other, the apparatus can be improved in impact resistance performance.

Additionally, the solid electrolyte, the anode, the cathode, and so on can be produced by screen printing. Thus, costs can be decreased.

The extended regions may be extended straightly, or may be extended to be curved at a single spot, or curved at plural spots to be zigzagged.

The second electrode may be made larger in area than the first electrode. If the second electrode, which is large in electric resistance, is equal in area to the first electrode, which is smaller in electric resistance, the rate of the electrochemical reaction for gas decomposition can be determined by the area of the second electrode. As described above, by making the second electrode large in area, the gas decomposition reaction can be promoted. Moreover, an increase is secondarily made in the sectional area of paths for charges flowing in the second electrode, which is large in electric resistance, thereby making it possible to restrain power consumption further in regions where the electrochemical reaction is not caused, such as a region connective with the electroconductive region.

As restricted initially to the specified case, the above-mentioned case is applied to a structure wherein the second electrode is a cathode, and the second electrode electroconductive region which is a cathode electroconductive region connected electroconductively to the power source and comprising an electroconductive material is extended in a direction crossing the direction in which the extended regions of the cathode are extended, thereby connecting the extended regions of the cathode electroconductively to each other. However, the invention may be broadly applied to a case where the anode is higher in electric resistance than the cathode. In this case, an electroconductive region of the anode is arranged to be extended along the direction in which the extended regions of the anode are extended. The largeness and the smallness of the respective electric resistances of the anode and the cathode are varied in accordance with a gas component to be decomposed. In the case of the decomposition of NOx, the reaction rate of NOx decomposition reaction on the cathode is small to be a determining rate. Accordingly, the cathode becomes higher in electric resistance than the anode.

It is allowable that the solid electrolyte layer is positioned over an insulating substrate, the extended regions of the cathode are extended from a first edge side of the solid electrolyte layer toward a second edge side thereof that is opposite to the first edge side, and the cathode electroconductive region is extended in parallel to the first edge of the solid electrolyte layer, or the insulating substrate. There are insulating substrates each made of a material that is excellent in mechanical strength and may be of various types. Thus, for the insulating substrate, use may be made of a material high in mechanical strength or a material that is not easily broken, so that the present gas decomposition apparatus can be improved in mechanical strength or endurance. By decreasing the width of the extended regions of the anode and the cathode (the length thereof along the direction crossing the extended direction), and the gap therebetween, spaces for the gap can be arranged at a high density on the solid electrolyte. As a result, an improvement can be made in gas decomposition amount per unit time and per unit area. In other words, by increasing the gap density="the length of the gap/the area of the solid electrolyte layer", an apparatus small in size and high in gas decomposition efficiency can be obtained.

The gap between the first and second electrodes may be set into the range from 2 to 200 μm. This manner makes it possible to shorten the shift distance of ions between the anode and the cathode to improve the decomposition rate of a gas to be decomposed. Thus, the temperature of the gas decomposition apparatus can be lowered. When a voltage is applied to the anode and the cathode across these electrodes, a large electric field is generated between the anode and the cathode since the gap is small. If the gap is more than 200 μm, much time is required for the shift of ions. Thus, good use is not easily made of the characteristics of the invention. If the gap is down to 2 μm, it is difficult to ensure the gap certainly from the viewpoint of production precision. The above-mentioned gap results in a large improvement in the ion shift rate to make an improvement in the gas decomposition rate.

The second electrode electroconductive region may comprise a Au paste. This manner makes it possible to avoid a situation that even when the apparatus is heated to high temperature to be operated, the electroconductive region is deteriorated by exhaust gases to be increased in electric resistance or the electroconductivity thereof is lost. About the Au paste, a resin or some other in the portion of the paste is naturally changed from the initial state by the high-temperature heating at the time of the operation.

It is allowable that the solid electrolyte layer is made oxygen ion electroconductive, and an oxide of a metallic-particle-chained body, GDC (gadolinium doped ceria), and $BaCO_3$ are incorporated into the second electrode. This manner makes it possible that the cathode which, for example, NOx is introduced into is brought into contact with NOx to withdraw oxygen ions and send out the oxygen ions to the solid electrolyte layer. As a result, NOx is decomposed so that nitrogen gas can be emitted from the cathode.

It is allowable that the solid electrolyte layer is made proton electroconductive, and an oxide of a metallic-particle-chained body, a noble metal, and a proton electroconductive material are incorporated into the second electrode. In this manner, for example, the cathode undergoes electrochemical reaction with protons shifted through the solid electrolyte from the anode to decompose NOx, so that from the cathode, nitrogen gas, water vapor, and others are emitted. Into the anode is incorporated a mixed gas of water vapor, hydrocarbons, hydrogen and others, so that the anode contacts the mixed gas, whereby the above-mentioned protons can be sent out to the solid electrolyte layer. Protons are smaller than oxygen ions to be large in diffusion speed. Thus, the operating temperature can be largely lowered. Protons are also large in ion mobility, thereby making it possible to increase the gas decomposition rate. When the operating temperature is lowered, there is produced, for example, an advantage that an inexpensive material may be used instead of the Au paste in the second electrode electroconductive region.

It is advisable to render the insulating substrate a substrate for reinforcing the solid electrolyte layer. This manner makes it possible to overcome the brittleness of the solid electrolyte, which is a large drawback thereof. As a result, the apparatus can be used in a space to which impact is frequently applied, such as an automobile.

The apparatus may have a structure wherein the solid electrolyte layer is positioned over each of the front surface and the rear surface of the insulating substrate. This manner makes it possible to overcome the brittleness of the solid electrolyte, which is a large drawback thereof while the downsizing of the gas decomposition apparatus is promoted. The use efficiency of a space for the arrangement of the gas decomposition apparatus can be made high.

The invention may have a structure wherein plural gas decomposition apparatuses each as described in any one of the above-mentioned embodiments are stacked over each other to have a gap between any adjacent two of the apparatuses, and the apparatuses are fixed in a chassis. This manner makes it possible to yield an apparatus large in gas decomposition volume and small in size.

The gas decomposition apparatus described in any one of the above-mentioned embodiments is mounted on an automobile, and the gas decomposition apparatus can be heated by waste heat from the automobile. For any automobile, a gas decomposition apparatus high in energy efficiency, in particular, a NOx decomposition apparatus high therein can be obtained.

<Gas Decomposition Apparatus for the Second Object>

The gas decomposition apparatus of the invention comprises first electrodes, a second electrode, solid electrolyte layers, and a power source for applying a voltage to the first electrodes and the second electrode across the first and second electrodes. The apparatus further comprises an electroconductor layer through which a negative electrode of the power source is electroconductively connected to the second electrode. In the apparatus, the second electrode is laminated onto the electroconductor layer to contact the electroconductor layer, laminates of "solid electrolyte layer/first electrode" that are each composed of one of the solid electrolyte layers and one of the first electrodes are positioned on the second electrode to contact the second electrode to have a gap between any adjacent two of the laminates, and the first electrodes are electroconductively connected to a positive electrode of the power source.

According to this structure, the solid electrolyte layers, which are brittle, are reinforced by the laminate composed of the electroconductive layer and the second electrode, so that the apparatus can be improved in impact resistance and the endurance.

A gas component involved in the reaction of the second electrode causes the advance of electrochemical reaction on the second electrode exposed to the gaps between the "solid electrolyte layer/first electrode" laminates. For this reason, in, for example, electrochemical reaction about which oxygen ions are shifted in the solid electrolyte, the oxygen ions are generated on the second electrode exposed to the gaps, and then the ions pass through side face regions of the solid electrolyte layers that face the gaps, so as to reach the first electrodes. Therefore, although the oxygen ions are shifted in the thickness direction of each of the solid electrolyte layers, the ions pass on the side faces of the solid electrolyte layers. Thus, the ions are shifted on the surface regions. The second electrode, the solid electrolyte layers, and the first electrodes are produced by sintering. When each paste therefor and some other are put into a mold to be shaped, the density of the surface layer becomes large; thus, paths for the shift of the oxygen ions or others become substantially large in sectional area. For this reason, the shift amount of the oxygen ions or the others increases so that the shift speed apparently becomes larger than the speed thereof inside the sintered body. As a result, by arranging the gaps into an appropriate size at a high density on the second electrode, gas decomposition can be attained with a high efficiency.

When the second electrode is higher in electric resistance than the first electrodes, the second electrode is arranged onto the electroconductor layer, thereby surface-contacting the electroconductor layer. Thus, a voltage drop in the second electrode caused by the electric resistance thereof can be remarkably reduced. This manner makes it possible to reduce the electric power consumed in the first electrodes largely, or substantially lose the power. In the application of a voltage from the power source, the voltage is applied to be concentrated into the thickness direction of the second electrode and the solid electrolyte layers (the first electrodes are each made rendered a good electroconductor). Therefore, a large electric field can be applied to the second electrode/the solid electrolyte layers so that the electrochemical reaction can be promoted and further the ion shift speed can be improved. For this reason, the apparatus can attain both of a restraint of power consumption and an improvement in gas decomposition rate.

Furthermore, the solid electrolyte, its anode(s) and its cathode(s) can be produced by screen printing or some other. Thus, costs can be decreased.

The apparatus may have a structure wherein the second electrode is a cathode; the cathode is laminated on the electroconductor layer to contact the layer; and the laminates which are laminates of "solid electrolyte layer/anode" each composed of one of the solid electrolyte layers and an anode are positioned on the cathode to contact the cathode, and have a gap between any adjacent two of the laminates. In this way, the cathode surface-contacts the electroconductor layer when the cathode is large in electric resistance. Thus, a voltage drop in the cathode caused by the electric resistance thereof can be remarkably reduced. This manner makes it possible to reduce the electric power consumed in the cathode largely, or substantially lose the power. In the application of a voltage from the power source, the voltage is applied to be concentrated into the thickness direction of the cathode and the solid electrolyte layers (the anodes are each made rendered a good electroconductor). Therefore, a large electric field can be applied to the cathode/the solid electrolyte layers so that the electrochemical reaction can be promoted and further the ion shift speed can be improved. For this reason, the apparatus can attain both of a restraint of power consumption and an improvement in gas decomposition rate. The largeness and the smallness of the respective electric resistances of the anodes and the cathode are varied in accordance with a gas component to be decomposed. In the case of the decomposition of NOx, the reaction rate of NOx decomposition reaction on the cathode is small to be a determining rate. Accordingly, the cathode becomes higher in electric resistance than the anode.

The apparatus may have a structure wherein the second electrode is an anode; the anode is laminated on the electroconductor layer to contact the layer; and the laminates which are laminates of "solid electrolyte layer/cathode" each composed of one of the solid electrolyte layers and a cathode are positioned on the anode to contact the anode, and have a gap between any adjacent two of the laminates.

When the anode is large in electric resistance, this manner causes the anode to surface-contact the electroconductor layer, thereby making it possible to reduce remarkably a voltage drop in the anode caused by the electric resistance thereof. This matter makes it possible to reduce the electric power consumed in the anode largely, or substantially lose the power. In the application of a voltage from the power source, the voltage is applied to be concentrated into the thickness direction of the anode and the solid electrolyte layers (the cathodes are each made rendered a good electroconductor). Therefore, a large electric field can be applied to the anode/the solid electrolyte layers so that the electrochemical reaction can be promoted and further the ion shift speed can be improved. For this reason, the apparatus can attain both of a restraint of power consumption and an improvement in gas decomposition rate.

Even when the cathodes are large in electric resistance, the effect of promoting gas decomposition reaction can be obtained when the rate of the gas decomposition is determined by the area of the cathodes. This is because the cathodes are positioned as the upper layers to contact gases easily so that unreacted gases are smoothly supplied thereto.

The cathode(s) may be made larger in area than the anode(s). The area referred to in this case denotes, when the cathode(s) or anode(s) is/are viewed in plan, the area of a viewable portion thereof, and does not include any hidden portion. In other words, the area is the second electrode area inside the gap regions, or the area of the first electrodes that are respective regions between which the gaps are sandwiched. When the cathode(s) is/are made larger in area than the anode(s), the following two cases are caused. (A1) The cathode(s) is/are positioned on the electroconductive layer to contact the layer, and the cathode(s) is/are larger in area than the anode(s). (A2) The cathode(s) is/are positioned (as one or more upper layers) on the anode(s) to contact the anode(s), and the cathode(s) is/are larger in area than the anode(s).

When the electric resistance of the cathode(s) is large in the case (A1), the gas decomposition reaction can be promoted because of the large area thereof while the power consumption in the cathode(s) is restrained.

When the electric resistance of the cathode(s) is large in the case (A2), the gas decomposition reaction can be promoted by the following two factors: the cathode(s) are positioned as the upper layer(s) so that unreacted gases are smoothly supplied to the cathode(s) to contact the cathode(s) sufficiently; and the area of the cathode(s) is large.

The respective gaps between the "solid electrolyte layer/first electrode" laminates, and the respective widths of the "solid electrolyte layer/first electrode" laminates may each be set into range from 2 μm to 1 mm. The second electrode is exposed to the gaps, so as to contact gas components. Thus, second electrode reaction is advanced. If the gaps are each narrower than 2 μm, the inflow and outflow of any gas are hindered so that the advance of the second electrode reaction is hindered, and further the gaps are not certainly kept with ease from the viewpoint of precision. If the gaps are each larger than 1 mm, the naked regions of the second electrode become too large so that the electrochemical reaction does not advance efficiently. If the widths of the "solid electrolyte layer/first electrode" laminates are each less than 2 μm, first electrode reaction is not sufficiently advanced with ease and further the gaps between the laminates are not easily kept with certainty from the viewpoint of precision. If the widths are each more than 1 mm, the regions of the first electrodes become too large so that an efficient advance of the gas decomposition is hindered. When the gaps, and the widths of the laminates are set into the above-mentioned respective ranges, the apparatus can be rendered a gas decomposition apparatus high in efficiency.

The respective thicknesses of the solid electrolyte layers may each be set to 20 μm or less. This manner makes it possible to shorten the period for the shift of ions shifted in the thickness direction of the solid electrolyte layers to improve the apparatus in gas decomposition efficiency. It is more preferred that each of the thicknesses of the solid electrolyte layers is smaller. However, if the thickness is made smaller than 1 μm, it is difficult that the solid electrolyte layers are arranged on the second electrode to contact the electrode with certainty. Thus, it is advisable to set the thickness to 1 μm or more. When the thickness can be made smaller from the viewpoint of working precision, the thickness may be about 0.5 μm or less.

The "solid electrolyte layer/first electrode" laminates may be, when viewed in plan, in at least one form selected from the following: (1) a form that two or more lines or bands are parallel to each other; (2) a comb-tooth form (the whole of the gaps is in a serpentine form); (3) a spiral form; (4) a dot or patch form; and (5) a region surrounding dot-form or patch-form regions (a complementary-set region of dot-form or patch-form regions). This manner makes it possible to arrange the gaps, wherein the second electrode is naked, and the "solid electrolyte layer/first electrode" laminates densely at a fine pitch on the second electrode or the electroconductor layer. Thus, a gas decomposition apparatus high in efficiency can be gained.

The above-mentioned respective gaps between the "solid electrolyte layer/first electrode" laminates, and the respective widths of the "solid electrolyte layer/first electrode" laminates are applicable, as they are, to the forms (1) to (3). However, about the forms (4) to (5), these are defined as follows: About the form (4), the average crossing-diameter of the dot-form or patch-form regions is defined as each of the widths (i.e., the width) of the "solid electrolyte layer/first electrode" laminates, and the average gap between the dot-form or patch-form regions is defined as each of the gaps between the "solid electrolyte layer/first electrode" laminates. About the form (5), the definitions about the form (4) are made reversed to each other, the definitions being each of the gaps between the "solid electrolyte layer/first electrode" laminates, and the width of the "solid electrolyte layer/first electrode" laminates.

The electroconductor layer may be rendered a metallic plate, or an electroconductor layer formed over an insulating substrate. This manner makes it possible to overcome the brittleness of the solid electrolyte layers, and so on, which is a large drawback thereof. Thus, the apparatus can be used in a space to which impact is frequently applied, such as an automobile. In other words, the above-mentioned insulating substrate is preferably rendered a substrate for reinforcing the solid electrolyte layers, thereby making it possible to overcome the brittleness of the solid electrolyte layers, and so on, which is a large drawback thereof. Thus, the apparatus can be used in a space to which impact is frequently applied, such as an automobile.

It is allowable that the second electrode is laminated over the electroconductor layer laid over each of the front surface and the rear surface of the metallic plate or over each of the front surface and the rear surface of the insulating substrate, and further the "solid electrolyte layer/first electrode" laminates are positioned over each of the second electrode at the front surface side and the second electrode at the rear surface side. This manner makes it possible to overcome the brittleness of the solid electrolyte layers, and so on, which is a large drawback thereof, while the downsizing of the gas decomposition apparatus can be promoted. The use efficiency of a space for the arrangement of the gas decomposition apparatus can be made high.

It is allowable that the solid electrolyte layers are made oxygen ion electroconductive, and an oxide of a metallic-particle-chained body, GDC (gadolinium doped ceria), and $BaCO_3$ are incorporated into the second electrode(s). This manner makes it possible that the cathode which, for example, NOx is introduced into is brought into contact with NOx to withdraw oxygen ions and send out the oxygen ions to the solid electrolyte layer. As a result, NOx is decomposed so that nitrogen gas can be emitted from the cathode.

It is allowable that the solid electrolyte layer is made proton electroconductive, and an oxide of a metallic-particle-chained body, a noble metal, and a proton electroconductive material are incorporated into the second electrode. In this manner, for example, the second electrode(s) undergo(es) electrochemical reaction with protons shifted through the solid electrolyte(s) from the first electrode(s) to decompose NOx, so that from the second electrode(s), nitrogen gas, water vapor and others are discharged. Into the first electrode(s) is incorporated a mixed gas of water vapor, hydrocarbons, hydrogen and others, so that the first electrode(s) contact(s) the mixed gas, whereby the above-mentioned protons can be sent out to the solid electrolyte layer(s). Protons are smaller than oxygen ions to be large in diffusion speed. Thus, the operating temperature can be largely lowered. Protons are also large in ion mobility, thereby making it possible to increase the gas decomposition rate.

The invention may have a structure wherein plural gas decomposition apparatuses each as described in any one of the above-mentioned embodiments are stacked over each other to have a gap between any adjacent two of the apparatuses, and the apparatuses are fixed in a chassis. This manner makes it possible to yield an apparatus large in gas decomposition volume and small in size.

The gas decomposition apparatus described in any one of the above-mentioned embodiments is mounted on an automobile, and the gas decomposition apparatus can be heated by waste heat from the automobile. For any automobile, a gas decomposition apparatus high in energy efficiency, in particular, a NOx decomposition apparatus high therein can be obtained.

Advantageous Effects of Invention

According to the gas decomposition apparatus of the invention, power consumption can be restrained in its solid electrodes, in particular, its electrode higher in electric resistance. Moreover, the gas decomposition rate can be improved.

Furthermore, according to the gas decomposition apparatus of the invention, power consumption can be restrained in the solid electrodes, in particular, the electrode higher in electric resistance while the apparatus can be improved in gas decomposition rate without being easily broken or damaged into any other manner.

BRIEF DESCRIPTION OF DRAWINGS

FIG. 1 (a) is a plan view thereof, FIG. 1(b) is a sectional view thereof that is taken along line IB-IB, and FIG. 1(c) is a sectional view thereof that is taken along line IC-IC.

FIG. 7(a) is a plan view thereof, FIG. 7(b) is a sectional view thereof that is taken along line VIIB-VIIB, and FIG. 7(c) is a sectional view thereof that is taken along line VIIC-VIIC.

FIG. 10(a) is a plan view thereof, FIG. 10(b) is a sectional view thereof that is taken along line IB-IB, and FIG. 10(c) is a sectional view thereof that is taken along line IC-IC.

FIG. 14(a), FIG. 14(b) and FIG. 14(c) illustrate a comb-tooth form, a parallel-band form, and a spiral form, respectively.

FIG. 15(a) and FIG. 15(b) illustrate a patch form, and a form of a complementary-set region of regions in a patch form, respectively.

FIG. 16(a) is a view illustrating a structure wherein gas decomposition regions are laid on both surfaces of an electroconductive plate, FIG. 16(b) is a view illustrating a structure wherein an electroconductive layer is laid on an insulating substrate and a gas decomposition region is laid on the electroconductive layer, and FIG. 16(c) is a view illustrating a structure wherein electroconductive layers are laid on both surfaces of an insulating substrate, respectively, and a gas decomposition region is laid on each of the electroconductive layers.

FIG. 17(a) is a plan view thereof, FIG. 17(b) is a sectional view thereof that is taken along line VIIIB-VIIIB, and FIG. 17(c) is a sectional view thereof that is taken along line VIIIC-VIIIC.

DESCRIPTION OF EMBODIMENTS

First Embodiment

Figure 1A:
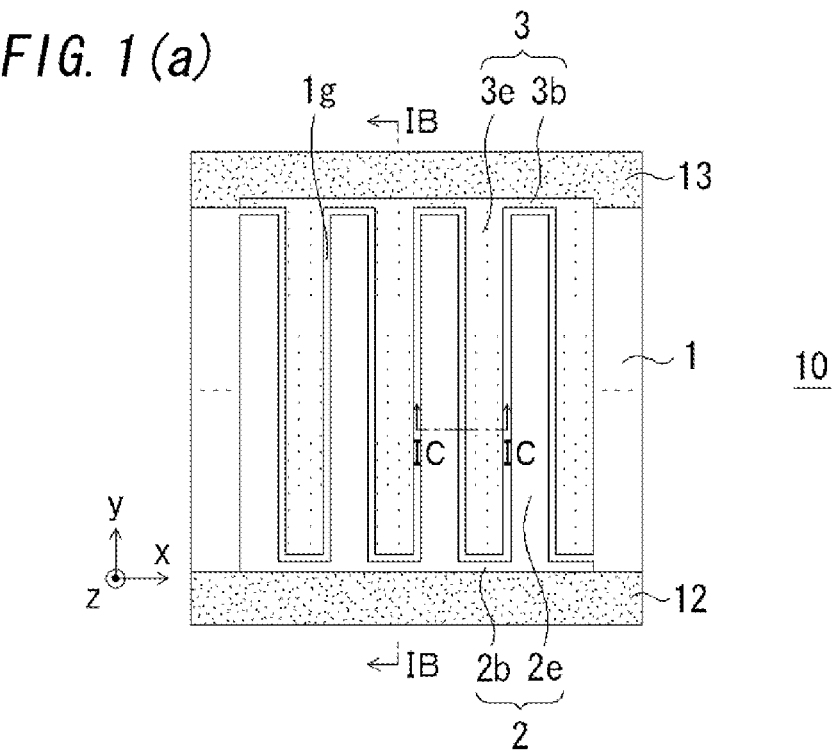
FIGS. 1(a) to 1(c) illustrate a gas decomposition apparatus in a first embodiment of the invention.
Figure 1B:
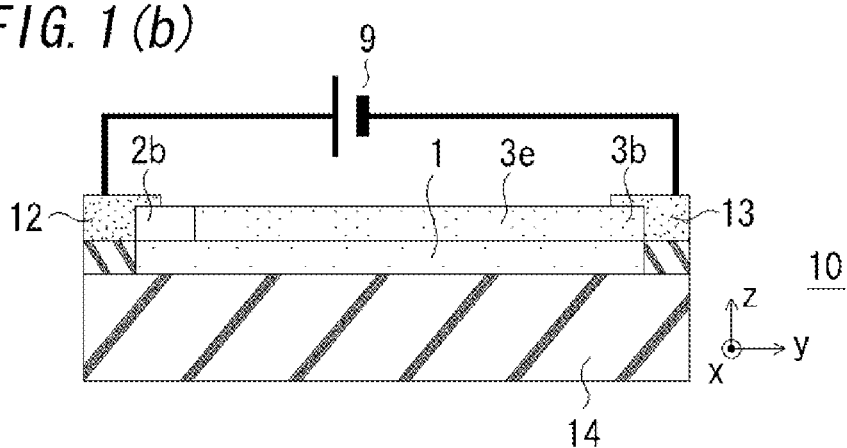
Figure 1C:
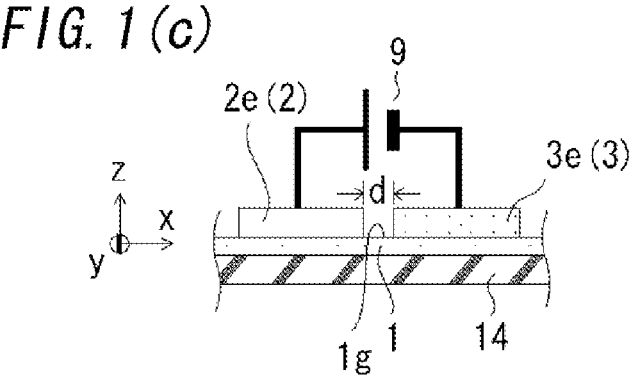

FIG. 1(a) is a plan view illustrating a NOx decomposition apparatus 10 that is a gas decomposition apparatus in a first embodiment of the invention; FIG. 1(b) is a sectional view thereof that is taken along line IB-IB; and FIG. 1(c) is a sectional view thereof that is taken along line IC-IC. In this NOx decomposition apparatus 10, a solid electrolyte layer 1 is positioned on an insulating substrate 14, and extended regions 2e of an anode (first electrode) 2 and extended regions 3e of a cathode (second electrode) 3 are alternately positioned to be brought into contact with the solid electrolyte layer 1. A gap 1g is made between the anode 2 and the cathode 3. The distance d of the gap 1g does not need to be constant. It is one of the points of the gap that the distance is as small as a value of about 10 μm to 1 mm. As illustrated in FIG. 1(a), the anode 2 and the cathode 3 are made mainly of the extended regions 2e and those 3e, respectively, which are apart from each other with the distance d of the gap 1g to be alternately extended in the y direction. In the present embodiment, the respective two-dimensional shapes of the insulating substrate 14, the solid electrolyte 1, and the others are each a rectangle. The rectangle preferably has a size of 10 cm×15 cm since this shape is easily formed. However, the size thereof is not limited thereto, and may be larger or smaller. A power source 9 is fitted to the anode 2 and the cathode 3 to apply a predetermined voltage or supply an electric power to the two electrodes across the two in accordance with a gas component to be decomposed. It is advisable to set the output power of the power source 9 into the range of about 10 to 20 V. To the cathode (second electrode) 3 is electroconductively connected the negative electrode of the power source 9. The cathode 3 is electroconductively connected through a cathode electroconductive region 13 to the power source 9. In this case, the cathode 3 is relatively high in electric resistance, and is higher therein than the anode (first electrode) 2. Thus, the cathode electroconductive region 13 rides on the whole of a root region 3b of the cathode 3 to contact the whole, and the extended regions 3e are electroconductively connected thereto in parallel. For this reason, the cathode electroconductive region 13 is positioned to be extended in a direction crossing the extended direction y of the extended regions 3e of the cathode 3. The point of the invention is that this cathode electroconductive region 13 electroconductively contacts all of the cathode extended regions 3e so that the restraint of power consumption in the cathode 3 is realized. By the arrangement of the cathode electroconductive region 13 illustrated in FIG. 1(a), the power consumption in the cathode 3 is restrained.

The extended regions of the anode 2 are also electroconductively connected to the positive electrode of the power source 9. However, the electric resistance of the anode 2 is not higher than that of the cathode 3; thus, it is unnecessary that an anode electroconductive region 12 is in the same form as adopted by the cathode electroconductive region 13. It is allowable that the anode electroconductive region 12 contacts only a side face of an anode root region 2b, or this region 12 is arranged in such a manner that in the same manner as attained by the cathode electroconductive region 13, the region 12 rides on the root region 2b of the anode 2 to contact the root region 2b so that the anode electroconductive region 12 is arranged to be extended in a direction (x direction) crossing the y direction, which is the direction in which the extended regions 2e are extended. In the following description, in some cases, when the word "anode 2" or "cathode 3" is used without distinguishing the electrode 2 or 3 strictly from the extended regions 2e or the extended regions 3e, respectively, the word denotes the extended regions 2e or the extended regions 3e.

The cathode electroconductive region 13 and the anode electroconductive region 12 are positioned along respective edges of the rectangular solid electrolyte layer 1, and respective edges of the insulating substrate 14. The edges of the solid electrolyte layer 1 or the other each denotes a region within the scope extending over a distance of several centimeters from an end face thereof, which is a side face thereof. The edge is rendered a region which does not hinder the formation of the extended regions 2e or 3e, which are a place where the electrochemical reaction (concerned) is mainly caused.

In accordance with a gas component to be decomposed, which of the anode 2 and the cathode 3 has a higher electric resistance is varied. When NOx is decomposed as in the present embodiment, silver particles as a catalyst are incorporated into the anode 2.

Into the cathode 3 are incorporated a metallic-particle-chained body to which an oxidized layer is attached, and an oxygen ion ceramic, so that the cathode 3 is higher in electric resistance than the anode 2. When water vapor or hydrogen is used to decompose ammonia, silver particles as a catalyst are used in the cathode and no silver particles are incorporated into the anode: therefore, the anode is higher in electric resistance than the cathode although this matter is not further referred to in the present embodiment. The reaction rate of NOx decomposition reaction on the cathode is slow so that the reaction is a rate-determining step. Accordingly, the cathode 3 is higher in electric resistance than the anode 2. It is decided by the easiness of the decomposition of the gas to be treated, or some other factor which of the electrodes is higher in resistance.

In the present embodiment, it is essential in the electrochemical reaction for the decomposition of NOx that oxygen ions ($O^{2-}$) generated by the reaction in the cathode 3 pass through the inside of the solid electrolyte 1 to reach the anode 2 in order that the reaction can last. However, in the case of using a solid electrolyte having proton electroconductivity, not oxygen ions but protons are shifted in a direction reverse to the above-mentioned direction (see a second embodiment). In the present embodiment, wherein the shift of the oxygen ions is used, at low temperatures, the period when the oxygen ions pass through the solid electrolyte 1 to reach the anode 2 determines the NOx decomposition rate in many cases. For this reason, the gas decomposition apparatus 10 is heated to 250° C. to 600° C. in order to improve the speed of the oxygen ions in the solid electrolyte 1, and relieve other restrictions of the reaction rate to promote the reaction. It is therefore preferred to arrange a heater, which is not illustrated in FIGS.

1(a) to 1(c). When this NOx decomposition apparatus 10 is arranged in an exhaust path of an automobile, it is advisable to heat the apparatus by use of waste heat from the automobile, together with the heater or instead of the heater.

The width d of the gap 1g illustrated in FIG. 1(c) is set usually to 200 µm or less. The width d of the gap 1g is set more preferably to 30 µm or less, even more preferably to 10 µm or less, for example, 5 µm. When the width d of this gap 1g is made small, the period when oxygen ions generated in the cathode 3 reach the anode 2 can be made short, resulting in a rise in the NOx decomposition rate. Alternately, in order to make the gas decomposition rate into a practical level, it is conceivable that when a burden is made light onto the heater or some other for heating or when the present apparatus is mounted onto an automobile or some other, waste heat is used and the heater or the other is removed. As disclosed in Patent Literature 3, as a conventional gas decomposition apparatus, suggested is a gas decomposition apparatus wherein a zirconia tube having an outside diameter of 10 mm and an inside diameter of 7 mm to have a thickness of 1.5 mm is used as a solid electrolyte layer to form a cathode on the internal surface of the zirconia tube and form an anode on the external surface within a predetermined scope from an end of the external surface. In this case, it is necessary that the oxygen ions diffuse in the region confined by the thickness of 1.5 mm (1500 mm) in the zirconia tube. Therefore, a voltage is applied to the zirconia tube, and further the gas decomposition apparatus is heated into the range of temperatures of 600° C. to 800° C., for example, 700° C. to be operated.

When the apparatus is mounted onto an automobile, it is not difficult to apply the voltage; however, it is not easy to locate, inside its exhaust system, a region to be heated to 700° C. As described about the present embodiment, the anode 2 and the cathode 3 are arranged on one of both the surfaces of the solid electrolyte 1 to make the small gap 1g therebetween, thereby making it possible to shorten largely the period for the oxygen ion shift in the solid electrolyte. In the gas decomposition apparatus 10 of the embodiment, the shift distance of the oxygen ions can be made smaller (1/(several tens to one hundred)) than that of the oxygen ions in the zirconia tube. In this way, the above-mentioned heating temperature is made low so that the present apparatus can be rendered a heating mechanism that can easily be mounted onto any automobile.

Figure 2:
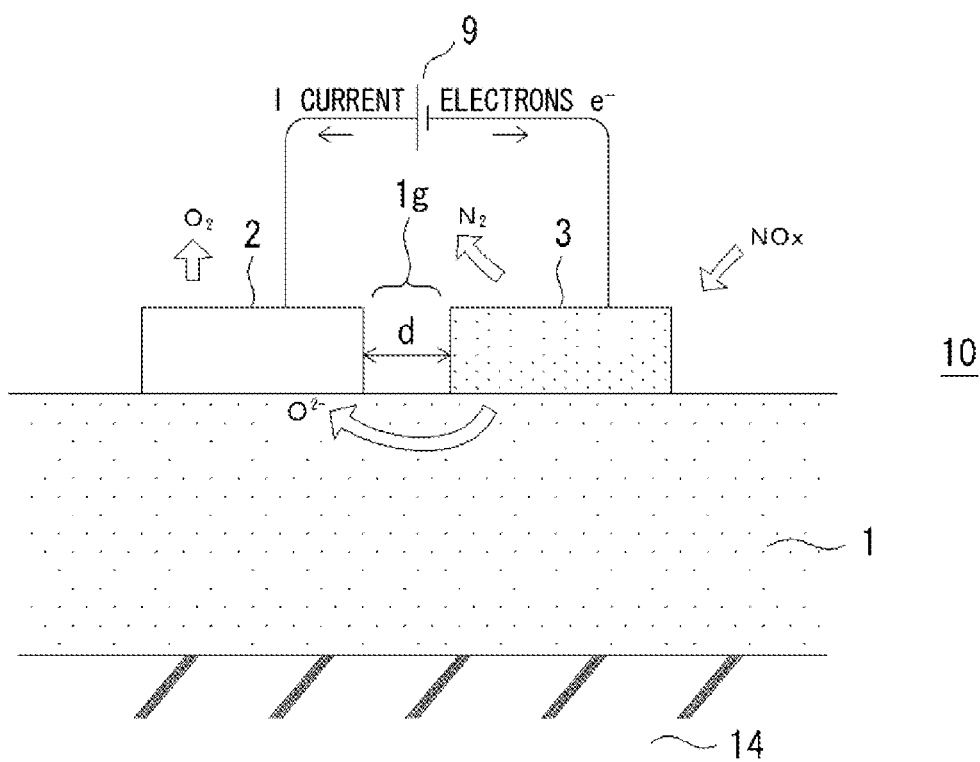
FIG. 2 is a view referred to in order to describe electrochemical reaction when an oxygen ion electroconductive solid electrolyte is used to decompose NOx.

FIG. 2 is a principle view that schematically shows the electrochemical reaction generated when the NOx decomposition apparatus 10 in the embodiment is used to decompose NOx. In the invention, the same exhaust gas is introduced into both of the anode 2 and the cathode 3 without distinguishing the anode 2 and the cathode 3 from each other. Most of the electrochemical reaction is conducted in the respective extended regions 2e and 3e of the anode 2 and the cathode 3; however, when the principle is described, the extended regions 2e and 3e are omitted in order to make the description simple and clear.

In the cathode 3, the following cathode reaction is generated: $2NO_2 + 8e^- \rightarrow N_2 + 4O^{2-}$, or $NO + 2e^- \rightarrow (½)N_2 + O^{2-}$. The oxygen ions $O^{2-}$ generated in the cathode reaction pass through the solid electrolyte 1 just below the cathode 3, and crosses the gap 1g to reach the anode 2.

In the anode 2, a reaction of $O^{2-} + O^{2-} \rightarrow O_2 + 4e^-$ is generated. The electrons $e^-$ advance from the anode 2 via an external circuit to the cathode 3 so as to be associated with the above-mentioned cathode reaction.

In FIG. 2, the cathode electroconductive region 13, and the anode electroconductive region 12 are arranged; however, these are omitted.

In an automobile, about the power source for applying a voltage to the anode 2 and the cathode 3 across these electrodes, it is preferred that an appropriate voltage of 10 V to 20 V is applied by use of an auxiliary battery or some other. As described above, the gap 1g is far smaller than the thickness of the solid electrolyte 1 in the case of arranging an anode and a cathode on the front and rear surfaces of the solid electrolyte 1, respectively, to sandwich the solid electrolyte 1 therebetween. Therefore, even when a small voltage is applied thereto, a large electric field can be generated between the anode and the cathode. The oxygen ions are improved in shift speed in the large electric field, so that the gas decomposition rate can be improved. Any gas decomposition apparatus mounted onto an automobile or some other receives a restriction about the voltage of its power source. Thus, when the anode 2 and the cathode 3 are arranged to be positioned in such a manner that these electrodes face each other with the small gap 1g, a large advantage is produced.

Respective materials of the cathode 3, the anode 2, and the solid electrolyte 1 are not particularly limited. The materials may each be any material as far as the material is permitted to cause the above-mentioned electrochemical reaction. Respective materials of the cathode 3, the anode 2 and the solid electrolyte 1 that will be described hereinafter are mere examples.

—Cathode—

Figure 3:
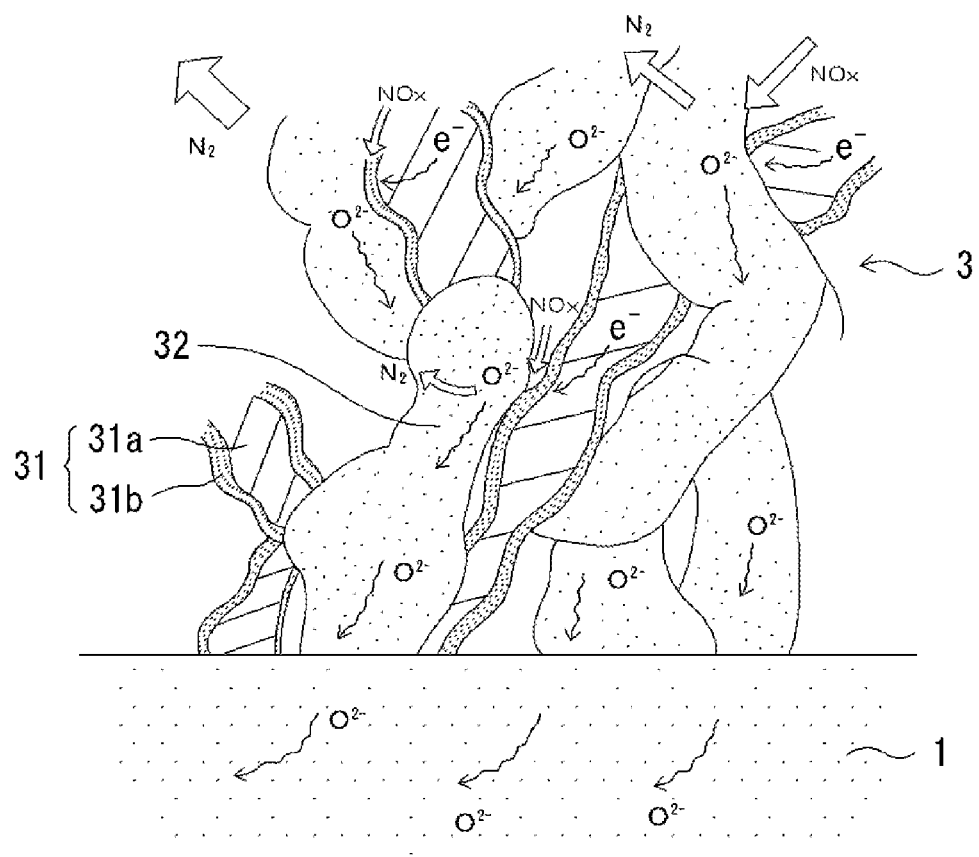
FIG. 3 is a view referred to in order to describe NOx decomposition reaction (cathode reaction) in a cathode in FIG. 2.

FIG. 3 is a view referred to in order to describe NOx decomposition reaction (cathode reaction) in the cathode 3. The cathode 3 is preferably a sintered body composed mainly of a Ni-particle-chained body 31 made of a metal 31a covered with a surface oxidized layer 31b, and an oxygen ion electroconductive ceramic 32. The oxygen ion electroconductive ceramic may be SSZ (scandium stabilized zirconia), YSZ (yttrium stabilized zirconia), SDC (samarium doped ceria), LSGM (lanthanum gallate), GDC (gadolinium doped ceria), or some other. By the addition of surface-oxidized metallic particles, in particular, the surface-oxidized metallic-particle-chained body (in a string or needle form) 31, catalytic effect can be increased and the above-mentioned electron conductivity can be heightened, so that the cathode reaction can be promoted. The electroconductive portion (metallic portion covered with the oxidized layer) 31a of the metallic-particle-chained body 31 may be made only of Ni, or may be made of Ni into which Fe, Ti or some other is incorporated.

The metal of the metallic-particle-chained body is preferably nickel (Ni). The metal may be a substance wherein Ni contains a small amount of iron (Fe). The metal is more preferably the substance containing Ti in a trace amount of about 2 to 10000 ppm. (1) Ni itself has a catalytic effect of promoting the decomposition of NOx. Moreover, the incorporation of Fe or Ti in a very small amount makes it possible to heighten the catalytic effect. Furthermore, a nickel oxide, which is formed by the oxidization of this metal Ni, makes it possible to make the promoting effect of this simple metal greatly higher. (2) The substance concerned has not only the catalytic effect but also an effect of causing electrons to participate in the decomposition reaction in the cathode. In other words, the decomposition is conducted in electrochemical reaction. In the above-mentioned cathode reaction, i.e., $NO + 4e^- \rightarrow N_2 + 2O^{2-}$, and $NO_2 + 8e^- \rightarrow N_2 + 4O^{2-}$, the contribution of electrons acts, so that the decomposition rate of NOx is largely improved. (3) For the cathode reaction, the shift of electrons $e^-$ is made smooth. Unless electrons $e^-$ are conducted to the cathode, the advance of the cathode reaction is hindered. The metallic-particle-chained body 31 is in a string or needle form to be slender, and the inside 31a thereof, which is covered with the oxidized layer 31b, is a highly electroconductive metal (Ni). Electrons e⁻ flow smoothly in the longitudinal direction of the string-form metallic-particle-chained body. For this reason, it does not occur that the electrons e⁻ are not conducted to the cathode 3. Thus, the electrons e⁻ pass through the inside 31a of the metallic-particle-chained body 31 to flow thereinto. The existence of the metallic-particle-chained body 31 makes the flow of the electrons e⁻ far smoother than the absence of the metallic-particle-chained body 31. However, the whole of the cathode 3 is high in electric resistance. The whole receives a contribution as described above, which is based on the arrangement of the cathode electroconductive region 13, whereby power consumption based on others than the gas decomposition in the cathode 3 can be restrained.

—Anode—

Figure 4:
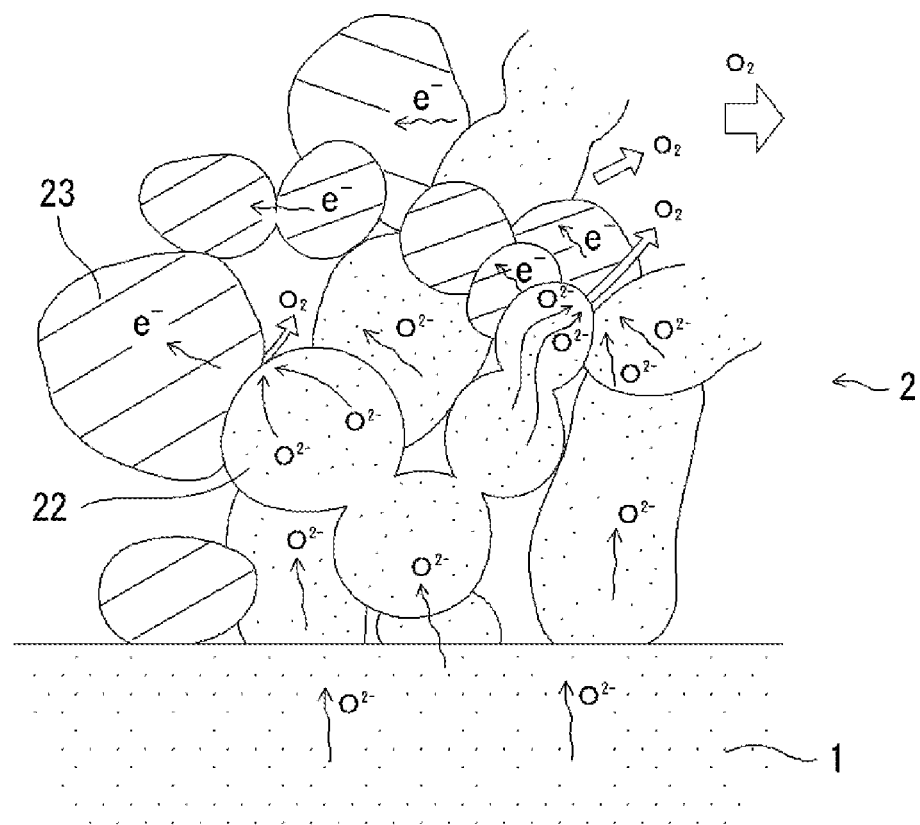
FIG. 4 is a view referred to in order to describe anode reaction in an anode in FIG. 2.

FIG. 4 is a view referred to in order to describe anode reaction in each of the anodes 2. The anode 2 is preferably a sintered body containing silver (catalyst) particles 23, and an oxygen ion electroconductive ceramic 22. The oxygen ion electroconductive ceramic 22 is preferably LSM (lanthanum strontium manganite), LSC (lanthanum strontium cobaltite), SSC (samarium strontium cobaltite), or some other.

—Solid Electrolyte—

The solid electrolyte 1 may be a solid oxide, a melted carbonate, phosphoric acid, a solid polymer, or some other that has oxygen ion electroconductivity. The solid oxide is preferred since the oxide can be made small in size, and is easily handleable. The solid electrolyte 1 is preferably SSZ, YSZ, SDC, LSGM, GDC, or some other.

—Production Process—

The materials which constitute the gas decomposition apparatus are commercially available except the metallic-particle-chained body. Commercially available products may be used. The insulating substrate 14 may be, for example, an aluminum ($Al_2O_3$) plate. The solid electrolyte 1 may be, for example, a commercially available product of a thin plate made of YSZ. The thickness thereof is preferably from several tens of micrometers to several hundreds of micrometers when the solid electrolyte 1 is bonded to the insulating substrate 14. The thickness of the solid electrolyte layer 1 is in particular preferably from 5 μm to 20 μm. The insulating substrate 14 may be, for example, an aluminum plate. For the bonding of the solid electrolyte 1 onto the insulating substrate 14, an existent sinterable binder may be used. When the insulating substrate 14 is not used, it is preferred to use a solid electrolyte having a thickness of several hundreds of micrometers to several millimeters in order that the apparatus can keep strength certainly.

The anode 2 and the cathode 3, which contain the above-mentioned components, respectively, are arranged on the solid electrolyte 1 by screen printing. The thickness of each of the anode 2 and the cathode 3 is set into the range preferably from 5 μm to 50 μm, in particular preferably from about 10 μm to 25 μm. The average particle diameter of the silver particles 23 in the anode 2 is set into the range preferably from 10 nm to 100 nm. The average particle diameter of the oxygen ion electroconductive ceramic particles 22 and 23, for example, LSM or GDC is preferably from 0.5 μm to 50 μm. The blend ratio of the silver particles to LSM, or that of the metallic-particle-chained body 31 to the GDC 32 is set into the range preferably from about 0.01 to 10.

A binder resin, an organic solvent, and the above-mentioned particles are mixed with each other into a paste form, and the paste is screen-printed. After the screen printing, for example, the workpiece is kept at a temperature of 800° C. to 900° C. in a reducing atmosphere for about 30 minutes to 180 minutes. In this way, the workpiece is sintered.

A laminate of the insulating substrate 14/the solid electrolyte layer 1/"the anode 2+the cathode 3" is formed, and then a gold (Au) paste is painted onto each of its cathode electroconductive region 12 and anode electroconductive region 13. The resultant is then dried.

(Process for Producing the Metallic-Particle-Chained Body)

The metallic-particle-chained body is not commercially available, and is an especial material. Thus, a process for producing the body will be described hereinafter.

(1) Metallic-Particle-Chained Body

It is advisable to produce the metallic-particle-chained body 31 by reducing precipitation technique. The reducing precipitation technique of the metallic-particle-chained body is detailed in JP-A No. 2004-332047. The reducing precipitation technique introduced therein is a process using a trivalent titanium (Ti) ion as a reducing agent. The metallic particles (such as Ni particles) precipitated thereby contain a trace amount of Ti. Thus, when the Ti content is quantitatively analyzed, the analyzed matter can be specified as a matter produced by the trivalent-titanium-ion-used reducing precipitation technique. When metal ions present together with trivalent titanium ions are varied, desired metallic particles can be obtained. In the case of Ni, Ni ions can be caused to exist together therewith. By the addition of a trace amount of Fe Ions, a Ni-particle-chained body containing a trace amount of Fe is formed.

In order to form the chained body, it is necessary that the metal is a ferromagnetic metal and further the particles thereof have a predetermined size or more. Since Ni and Fe are ferromagnetic metals, the metals can each form a metallic-particle-chained body with ease. The requirement about the size is necessary for the step in which: the ferromagnetic metal forms magnetic domains; the domains are bonded to each other by magnetic force; while the bonded state is kept, the metal precipitates; and then a layer of the metal grows so that the whole of the domains are integrated into a metallic body. Metallic particles having the predetermined size or more are bonded to each other by magnetic force. Also thereafter, the metal precipitation continues. For example, necks of boundaries between the bonded metal particles each grow, together with the other portions of the metallic particles, into a thick form. The average diameter D of the metallic-particle-chained body contained in the cathode 3 is set preferably to 5 nm or more and 500 nm or less. The average length L is set preferably to 0.5 μm or more and 1000 μm or less. The ratio of the average length L to the average diameter D is set preferably to 3 or more. However, the metallic-particle-chained body may be a body having a dimension out of these ranges.

(2) Surface Oxidization

Preferred examples of a manner for the surface oxidizing treatment of the metallic-particle-chained body are the following three: (1) thermally treating oxidization according to a gas phase process; (ii) electrolytic oxidization; and (iii) chemical oxidization. In the manner (i), it is preferred that the workpiece is treated at 500 to 700° C. in the atmosphere for 1 to 30 minutes. Although this manner is the simplest manner, it is difficult to control the thickness of the oxidized film. In the manner (ii), a potential of about 3 V relative to that of a standard hydrogen electrode is applied to the workpiece to conduct anodic oxidization, thereby attaining the surface oxidization. This manner is characterized in that in accordance with the electricity quantity corresponding to the area of the surface, the thickness of the oxidized film can be controlled. However, this manner is a manner about which when the surface is made into a large area, it is difficult that the oxidized film is evenly deposited. In the manner (iii), the workpiece is immersed in a solution wherein an oxidizer such as nitric acid is dissolved for about 1 to 5 minutes, thereby attaining the surface oxidization. The oxidized film thickness can be controlled in accordance with the period, the temperature, and the species of the oxidizer. However, much labor is required for washing the chemical agent. Any one of the manners is preferable. The manner (i) or (iii) is more preferable.

The thickness of the oxidized layer 31$b$ is desirably from 1 nm to 100 nm, more preferably from 10 nm to 50 nm. However, the thickness may be out of this range. If the oxidized coating is too thin, the catalytic function becomes insufficient. It is also feared that the coating is metallized only by effect of a slight reducing atmosphere. Reversely, if the oxidized coating is too thick, the catalytic performance is sufficiently kept; however, the electron conductivity of the interface is lost so that the decomposition apparatus is deteriorated in power generating performance.

According to the NOx decomposition apparatus, the cathode electroconductive region 13, made of an electroconductive material, attains electroconductive parallel-connection between the extended regions 3$e$ of the cathode 3, so that a voltage drop based on the electric resistance of the cathode is restricted into the extended regions 3$e$. In other words, the power consumption caused by the high resistance of the cathode in the electrochemical reaction is restricted to "the power consumption at each of the cathode extended regions"×"the number of the cathode extended regions". On the gas decomposition apparatus 10, wiring led around for connecting the power source 9 electroconductively to the cathode 3 is restricted onto the cathode electroconductive region 13. The cathode 3 is arranged to be restricted into a place where the effect of the gas decomposition is expressed. This manner makes it possible to use electric power consumed in the cathode at a region concerned directly with gas decomposition.

Moreover, the respective extended regions 2$e$ and 3$e$ of the anode 2 and the cathode 3, which cause the electrochemical reaction, can be arranged at a high density on the rectangular solid electrolyte layer 1. The extended regions 2$e$ and 3$e$ are arranged in parallel to some of the edges of the rectangular solid electrolyte layer 1 or insulating substrate 14. Additionally, the gap 1$g$ between the anode 2 and the cathode 3 can be made narrow within the precision of the apparatus; therefore, the period when oxygen ions and others shift between the anode 2 and the cathode 3 can be shortened. Thus, the gas decomposition rate can be improved even when the temperature of the apparatus is not made as high as in the prior art. As a result, the gas decomposition can be attained at a practical level.

Furthermore, for the solid electrolyte layer 1, which is brittle, there is generated a margin for making use of the rear surface or some other of the solid electrolyte layer 1 to reinforce the layer. When in the present embodiment the aluminum substrate 14 is used to apply the reinforcement to the rear surface or the other, the apparatus can be improved in impact resistance performance. The solid electrolyte 1, the anode 2, the cathode 3, and so on can be produced by screen printing, or the like. Thus, costs can be decreased.

Modified Example 1 of First Embodiment

Figure 5:
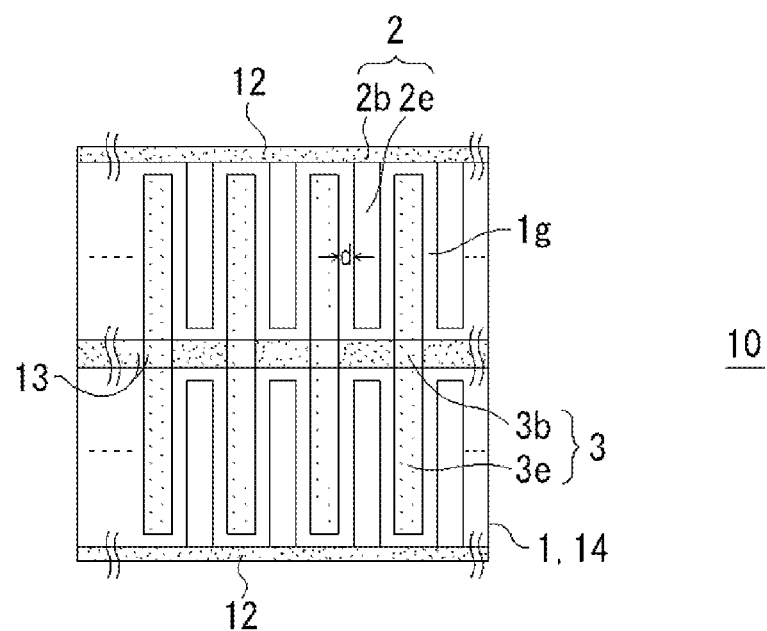
FIG. 5 is a view illustrating a modified example 1 of the first embodiment of the invention.

FIG. 5 is a view illustrating a gas decomposition apparatus of an example of the embodiment of the invention, which is a modified example 1 of the first embodiment. A gas decomposition apparatus 10 illustrated in FIG. 5 basically has the same structure as the gas decomposition apparatus 10 illustrated in FIG. 1; however, the apparatus has the following originality: Extended regions 3$e$ of a cathode 3 are arranged to be extended over the whole of the width or length of a solid electrolyte layer 1. At the center of the cathode extended regions 3$e$, a cathode electroconductive region 13 is laid which is extended to cross the extended direction. An anode 2 is separated to two parts. From two anode electroconductive regions 12 positioned along two opposed edges of a rectangle, respectively, and at respective ends of the edges, a voltage is applied.

About the cathode extended regions 3$e$, this structure makes it possible to halve the distance from the cathode electroconductive region 13 to the tip of each of the extended regions 3$e$ when the wholes of these two examples of the embodiment have the same shape. In other words, when the length of the whole of each of the extended regions 3$e$ of the cathode is equal to that in FIG. 1, it is possible to halve the distance from the cathode electroconductive region 13 to the tip of each of the extended regions 3$e$. As a result thereof, the power consumption in the cathode, which is relatively high in electric resistance, can be further restrained. As a result, in the anode 2 also, it is possible to halve, in each of the anode extended regions 2$e$, the distance from the anode electroconductive region 12 (concerned) to the tip of the extended region 2$e$. Naturally, the power consumption in the anode 2 can be restrained although the restrained value is small.

The power consumption in the cathode 3 in the gas decomposition apparatus 10 in FIG. 1 can be restrained by replacing the cathode 3, the cathode extended regions 3$e$, and a cathode root region 3$b$ in FIG. 5 by the anode 2, the anode extended regions 2$e$, and an anode root region 2$b$, respectively, and further replacing the anode 2, the anode extended regions 2$e$ and the anode root region 2$b$ in FIG. 5 by the cathode 3, the cathode extended regions 3$e$ and the cathode root region 3$b$, respectively; this matter is newly not illustrated. In other words, even when the anode 2 and the cathode 3 in FIG. 5 are exchanged with each other, the power consumption in the cathode 3 can be restrained in the same manner as in the gas decomposition apparatus 10 in FIG. 5.

Modified Example 2 of First Embodiment

Figure 6:
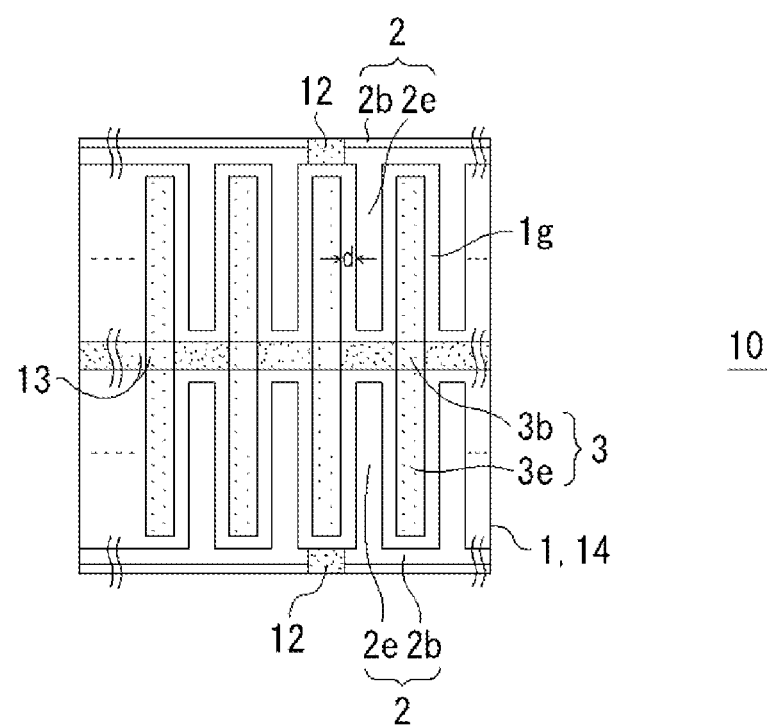
FIG. 6 is a view illustrating a modified example 2 of the first embodiment of the invention.

FIG. 6 is a view illustrating an example of the embodiment of the invention, which is a modified example 2 of the first embodiment. A gas decomposition apparatus 10 illustrated in FIG. 6 basically has the same structure as the gas decomposition apparatus 10 illustrated in FIG. 1; however, the apparatus has the following originality:

(1) Extended regions 3$e$ of a cathode 3 are located to be extended over the whole of the width or length of a solid electrolyte layer 1. At the center of the cathode extended regions 3$e$, a cathode electroconductive region 13 is laid which is extended to cross the extended direction. This is the same as in the gas decomposition apparatus 10 in FIG. 5.

(2) An anode electroconductive region 12 for applying a voltage to an anode 2 is located at a single position on each of two (opposed) sides of a rectangle. Through each of anode root regions 2$b$, which is continuous along the edge of the side, a voltage is applied to plural anode extended regions 2$e$.

The item (1) is the same structure as in the modified example 1 (FIG. 5). The item (2) makes it possible to reduce the use amount of a gold paste, which is relatively expensive. The anode 2 contains silver particles 23 to be low in electric resistance; therefore, even when the anode root region 2$b$ is used as an anode electroconductive region as illustrated in FIG. 6, power consumption is not substantially increased.

Second Embodiment

Figure 7A:
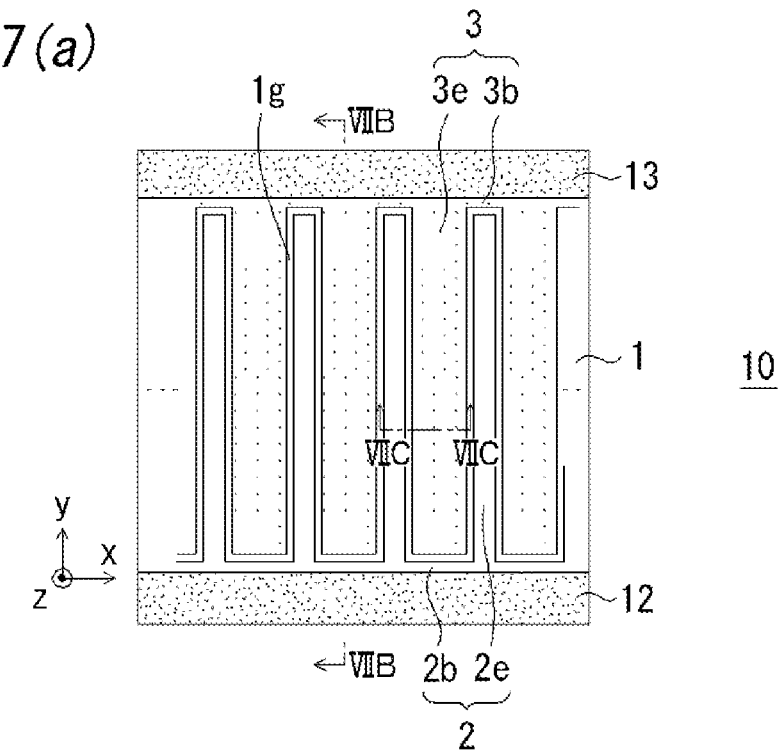
FIGS. 7(a) to 7(c) illustrate a gas decomposition apparatus in a second embodiment of the invention.
Figure 7B:
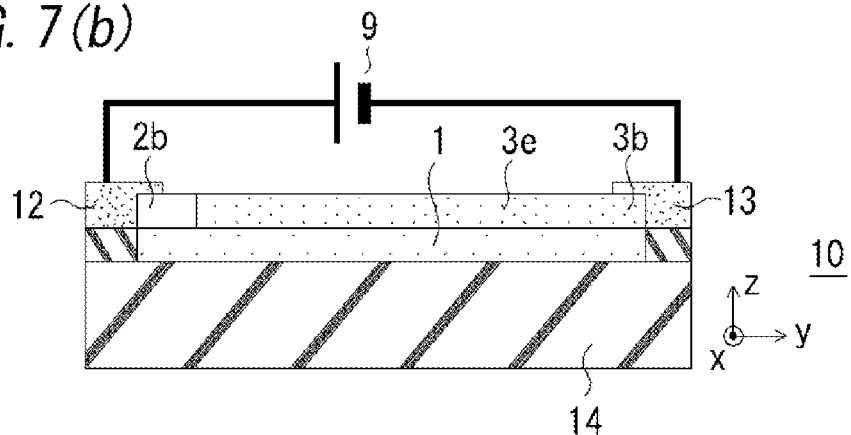
Figure 7C:
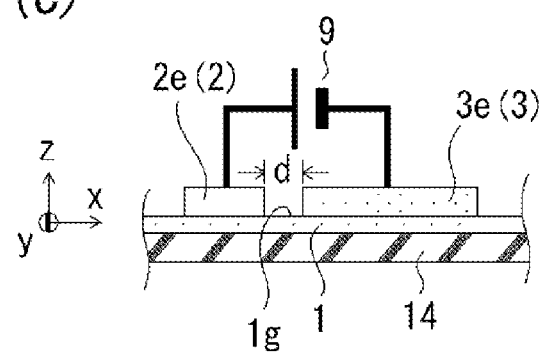

FIG. 7($a$) is a plan view illustrating a NOx decomposition apparatus 10 that is a gas decomposition apparatus in a second embodiment of the invention; FIG. 7(b) is a sectional view thereof that is taken along line VIIB-VIIB; and FIG. 7(c) is a sectional view thereof that is taken along line VIIC-VIIC. The NOx decomposition apparatus 10 of the present embodiment is characterized in a cathode 3 is larger in area than an anode 2. Other parts or portions are the same as in the NOx decomposition apparatus of the first embodiment (FIG. 1). Most of the area of the cathode 3 or the anode 2 is occupied by cathode extended regions 3e or anode extended regions 2e. Thus, about the relationship about smallness and largeness between these areas, it can be mentioned in other words that the cathode extended regions 3e are larger than the anode extended regions 2e.

The NOx decomposition efficiency is determined by the area of the cathode 3, and is in proportion to the area of the cathode 3. Thus, if the cathode 3 is equal in area to the anode 2, the NOx decomposition efficiency gets out of the optimal condition therefor. By making the cathode 3 larger in area than the anode 2, conditions for the NOx decomposition can be rendered the optimal conditions for the NOx decomposition efficiency, or can be made still nearer to the optimal conditions. Apart from a matter as to whether or not the NOx decomposition conditions are consistent with the optimal conditions, in a case where the cathode 3 is larger in area than the anode 2 as illustrated in FIG. 7, at least the NOx decomposition efficiency is made far better than in the NOx decomposition apparatus wherein the cathode 3 is equal in area to the anode 2. How much the cathode 3 should be made larger in area than the anode 2 is largely affected by the performances and the sizes of the individual constituting regions 1, 2, 3 and 1g, and other factors. It is therefore advisable to make a calculation to some degree, and then decide details experimentally.

As illustrated in FIG. 7(a), the extended regions 3e of the cathode 3 are equally made larger than each of the extended regions 2e of the anode 2, thereby making it possible to increase the sectional area of paths for charges in the cathode 3, which is high in electric resistance. As a result, it is possible to further restrain the electric power consumed in regions other than any region where NOx is decomposed, examples of the regions including a connecting region between the cathode 3 and an electroconductive region 13.

For an insulating substrate 14, use is made of a material excellent in mechanical strength, for, sintered aluminum, thereby making it possible to heighten the mechanical strength to improve the apparatus in endurance. This matter and others are the same as in the first embodiment. The production process thereof is also the same as therein except only that the cathode 3 and the anode 2 are made different from each other in area.

Third Embodiment

Figure 8:
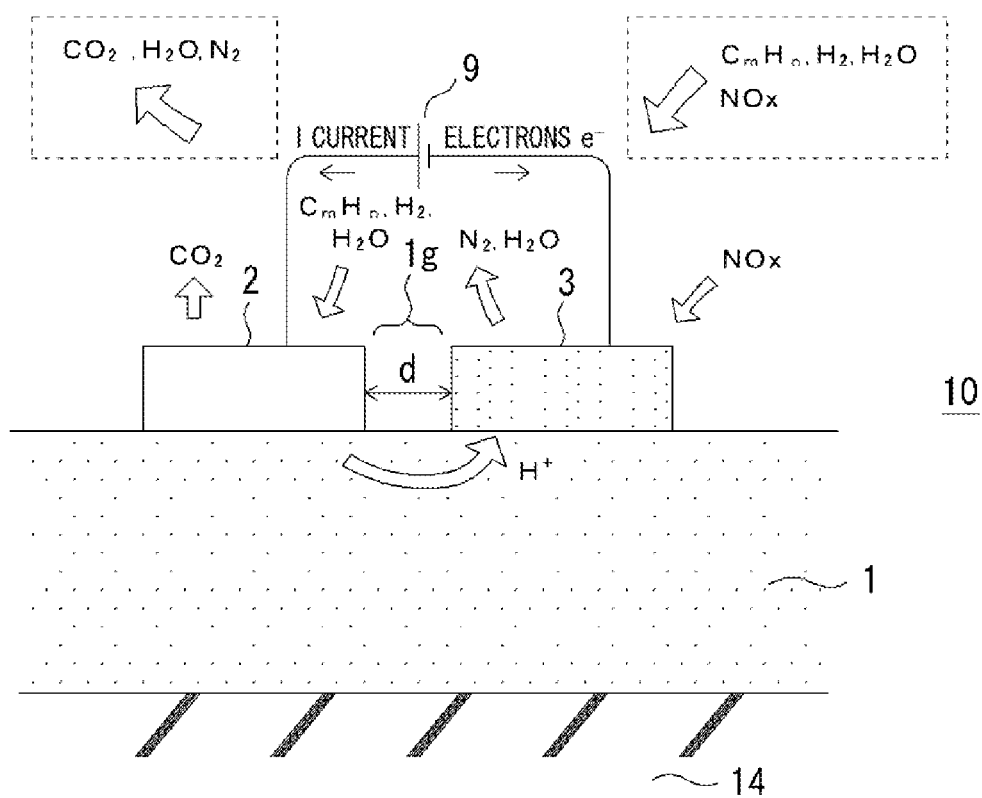
FIG. 8 is a view referred to in order to describe a principle of a gas decomposition apparatus in a third embodiment of the invention.

FIG. 8 is a view referred to in order to describe a principle of a gas decomposition apparatus in a second embodiment of the invention. The form of the gas decomposition apparatus in the third embodiment, which is an apparatus 10, is basically equal to that of the gas decomposition apparatus 10 illustrated in FIG. 1, or FIG. 5 or 6. In the third embodiment, about the content of material, the oxygen ion shifting material in the first embodiment is changed to a proton shifting material. Exhaust gases from automobiles include not only NOx but also hydrocarbons (CmHn), hydrogen ($H_2$), water vapor ($H_2O$) and others. In the exhaust gases is put the gas decomposition apparatus 10 having the layout illustrated in FIG. 1, or FIG. 5 or 6 and made of a material corresponding to the shift of protons. In its anode 2 and cathode 3, reactions are as follows:

"Anode reaction": proton ($H^+$) supplying reaction advances according to the following (A1) and/or (A2):

$$H_2 \to 2H^+ + 2e^- \quad (A1)$$

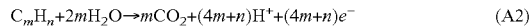

$$C_mH_n + 2mH_2O \to mCO_2 + (4m+n)H^+ + (4m+n)e^- \quad (A2)$$

"Cathode Reaction":

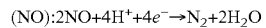

$$(NO): 2NO + 4H^+ + 4e^- \to N_2 + 2H_2O$$

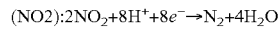

$$(NO2): 2NO_2 + 8H^+ + 8e^- \to N_2 + 4H_2O$$

In the present embodiment, a solid electrolyte layer 1 is made of a proton electroconductor. The proton electroconductive material may be, for example, $CsHSO_4$, or $BaZrO_3$.

The anode 2 is made of, for example, Ag particles, and proton electroconductive ceramic particles of $CsHSO_4$ or $BaZrO_3$. The cathode 3 is made of, for example, a surface-oxidized material of a Ni-particle-chained body, proton electroconductive ceramic particles of $BaZrO_3$ or $CsHSO_4$, and a noble metal such as Pt or Rh.

In the embodiment also, the anode 2 is low in electric resistance since the anode 2 contains the Ag particles. The cathode 3 is relatively high in electric resistance since the core of the surface-oxidized material of the Ni-particle-chained body is an electroconductive material but has been surface-oxidized. For this reason, the gas decomposition apparatus 10 of the present embodiment, wherein proton shift is used, is identical with the first embodiment in that cathode(s) 3 is/are relatively high in electric resistance. Thus, the effects and advantages of the cathode electroconductive region 13 and so on that have been described with reference to FIG. 1 (the first embodiment), FIG. 5 (the modified example 1), or FIG. 6 (the modified example 2) are true, as they are, in the gas decomposition apparatus of the present embodiment also. Furthermore, the present apparatus may be an apparatus wherein the cathode 3 is larger in area than the anode 2, as illustrated in FIG. 7 (the second embodiment). In other words, the solid electrolyte and so on in the NOx decomposition apparatus illustrated in FIGS. 7(a) to 7(c) may be replaced by ones for proton conduction, as described above.

In the embodiment, proton shift is used, so that the proton shift speed is higher than the oxygen ion shift speed; thus, the following and other advantages can be obtained: the gas decomposition apparatus can be made low in operating temperature; and according to comparison at the same operating temperature, the gas decomposition apparatus can be larger in gas decomposition rate.

Forth Embodiment

Figure 9:
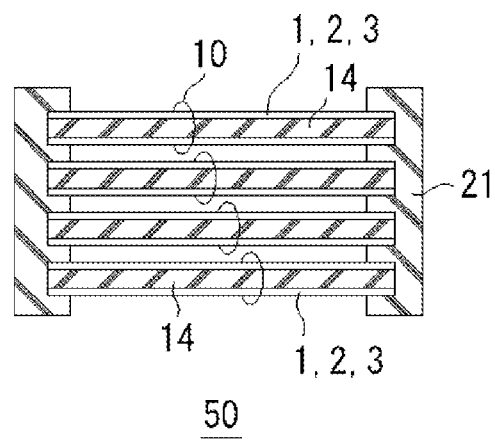
FIG. 9 is a view illustrating a gas decomposition apparatus (plural-laminate structure) in an fourth embodiment of the invention.

FIG. 9 is a view illustrating a gas decomposition apparatus 50 of a fourth embodiment of the invention. In this gas decomposition apparatus, on each of both surfaces of an insulating substrate 14 is arranged the NOx decomposition apparatus 10 of the first embodiment, the modified example 1 or 2 thereof, the second embodiment, or the third embodiment. In addition to this insulating substrate 14, one or more insulating substrates 14 identical therewith are arranged. These substrates 14 each have, on each surface thereof, a solid electrolyte layer 1, an anode 2, and a cathode 3 arranged. These insulating substrates 14 are stacked and held by a laminate supporting member 21. Of course, this apparatus 50 is identical with the first embodiment, the modified example 1 or 2 thereof, the second embodiment, and the third embodiment in the following points: (in each of the apparatuses 10) cathode extended regions 3e are electroconductively connected to each other in parallel through a cathode electroconductive region 13; and the anode 2 and the cathode 3 are arranged on the solid electrolyte layer 1 to face each other with a gap 1g having a distance of several micrometers to several tens of micrometers.

When the gas decomposition apparatus 50 in FIG. 8 is mounted onto, for example, an automobile, it is advisable to set the height, the width, the depth and the total volume of the apparatus 50 into the range of about 10 to 15 cm, that of about 10 to 15 cm, that of about 10 to 20 cm, and that of about 1.5 to 2 L, respectively. This is a volume similar to that of a NOx decomposition apparatus using a ternary catalyst.

When the NOx decomposition apparatuses 10, the number of which is, for example, about 20, are stacked on each other to have a space between any adjacent two thereof as described above, a large volume of NOx can be decomposed in a short period. Thus, the present apparatus 50 can be used to decompose NOx in exhaust gases from a diesel engine. Moreover, the apparatus 50 can gain the advantages of the first embodiment, the modified example 1 or 2 thereof, the second embodiment, or the third embodiment. Specifically, by the cathode electroconductive regions 13, power consumption in the cathodes 3 can be restrained, and further the gap between each of the anodes and the cathode (paired therewith) can be made narrow. Therefore, the period for the shift between the anode and the cathode can be made short, so that the gas decomposition rate can be improved even when the temperature is not made higher than in the prior art. As a result, the gas decomposition can be attained at a practical level. Furthermore, for the solid electrolyte layer, which is brittle, there is generated a margin for making use of the rear surface or some other of the solid electrolyte layer to reinforce the layer. By applying the reinforcement onto the rear surface or the other, the apparatus can be improved in impact resistance performance. Additionally, the solid electrolyte, the anode, the cathode, and so on can be produced by screen printing. Thus, costs can be decreased.

For the embodiment of the invention, the description has been made about a case where NOx is decomposed in the state that the second electrode (higher in electric resistance than the first electrode) is a cathode; however, the second electrode may be an anode in order to decompose other gas components.

Fifth Embodiment

Figure 10A:
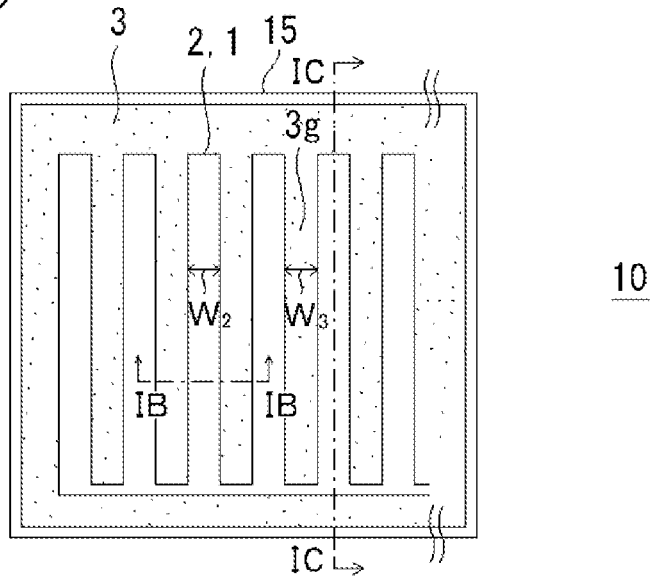
FIGS. 10(a) to 10(c) illustrate a gas decomposition apparatus in a fifth embodiment of the invention.
Figure 10B:
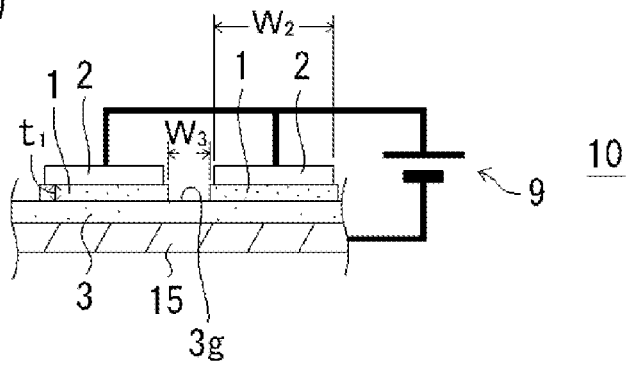
Figure 10C:
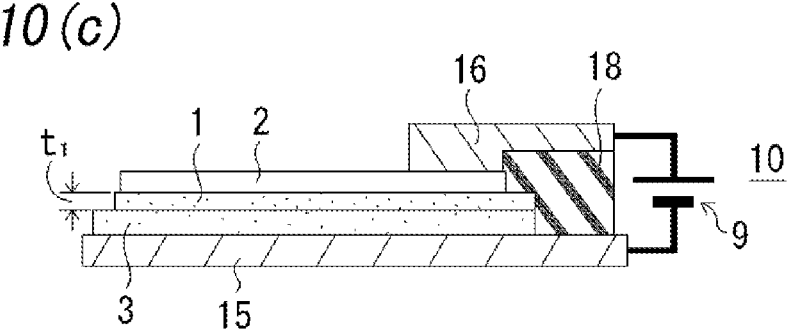

FIG. 10(a) is a plan view illustrating a NOx decomposition apparatus 10 that is a gas decomposition apparatus in a fifth embodiment of the invention; FIG. 10(b) is a sectional view thereof that is taken along line IB-IB; and FIG. 10(c) is a sectional view thereof that is taken along line IC-IC. In this NOx decomposition apparatus 10, its first electrodes are each an anode 2, and its second electrode, which is higher in electric resistance than the first electrodes, is a cathode 3. The cathode (second electrode) 3 is laminated on a electroconductor plate 15, which is a electroconductor layer, and laminates each composed of a solid electrolyte layer 1 and one of the anodes (first electrodes) 2 are arranged to contact the cathode 3 and have a gap 3g having a size of w3 between any adjacent two of the laminates. The respective sizes w3 of the gaps 3g do not need to be constant. It is one of the points of the embodiment that the sizes w3 are each made as small as a value of about 2 µm to 1 mm, and the respective widths w2 of the laminates (each made of the "solid electrolyte layer 1/anode 2") are each made near to each of the sizes w3 so as to be as small as a value of 2 µm to 1 mm. In other words, it is important that the gaps 3g and the laminates (each made of the "solid electrolyte layer 1/anode 2") are alternately and densely distributed at a fine pitch on the cathode 3.

In the present embodiment, the two-dimensional shapes of the electroconductor plate 15 and the cathode 3 are each a rectangle. The rectangle preferably has a size of 10 cm×15 cm since this shape is easily formed. However, the size thereof is not limited thereto, and may be larger or smaller. A power source 9 is located between the anodes 2 and the cathode 3 to apply a predetermined voltage or supply an electric power to the two electrode species across the two in accordance with a gas component to be decomposed. It is advisable to set the output power of the power source 9 into the range of about 10 V to 20 V. The negative electrode of the power source 9 is electroconductively connected to the cathode 3. Specifically, the cathode 3 is electroconductively connected through the electroconductor plate 15, which surface-contacts the cathode, to the power source 9. The cathode 3 is relatively high in electric resistance. Thus, when power is supplied (to the cathode) through the surface contact with the electroconductor plate 15 connected electroconductively to the power source 9 as illustrated in FIG. 10, a voltage drop in the cathode 3 is generated substantially only in the thickness direction. For practical use, therefore, power consumption in the cathode 3 can be substantially ignored.

The anodes 2 are each electroconductively connected to the positive electrode of the power source 9. Since the anodes 2 contain silver particles, the anodes are not higher in electric resistance than the cathode 3, and are rather good electroconductors (than poor electroconductors). It is therefore advisable to distribute electricity to the anodes 2, which are independently of each other, in a manner for electric connection to an electroconductor. In FIG. 10(c), the anodes 2 are electroconductively connected to the power source 9 through a gold paste 16 passing on an insulator 18 such as alumina.

In accordance with a gas component to be decomposed, which of the anode 2 and the cathode 3 has a higher electric resistance is varied. When NOx is decomposed as in the present embodiment, silver particles as a catalyst are incorporated into the anode 2. The reaction rate of NOx decomposition reaction on the cathode is slow so that the reaction is a rate-determining step. Accordingly, the cathode 3 is higher in electric resistance than the anode 2. It is decided by the easiness of the decomposition of the gas to be treated, or some other factor which of the electrodes is higher in resistance.

According to the present embodiment, in electrochemical reaction for NOx decomposition, it is essential for the continuation of the reaction that oxygen ions ($O2^-$) generated in reaction at the cathode 3 pass through the inside of the solid electrolytes 1 to reach the respective anodes 2. However, in the case of using a solid electrolyte having proton electroconductivity, not oxygen ions but protons are shifted in a direction reverse to the above-mentioned direction (see a sixth embodiment). In the present embodiment, wherein the shift of the oxygen ions is used, at low temperatures, the period when the oxygen ions pass through the solid electrolyte 1 to reach the anode 2 determines the NOx decomposition rate in many cases. For this reason, the gas decomposition apparatus 10 is heated to 250° C. to 600° C. in order to improve the speed of the oxygen ions in the solid electrolyte 1, and relieve other restrictions of the reaction rate to promote the reaction. It is therefore preferred to arrange a heater, which is not illustrated in FIGS. 10(a) to 10(c). When this NOx decomposition apparatus 10 is arranged in an exhaust path of an automobile, it is advisable to heat the apparatus by use of waste heat from the automobile, together with the heater or instead of the heater.

The gaps $3g$ are regions where the cathode 3 is exposed to the outside air, and are regions where the cathode 3 is involved in the electrochemical reaction for gas decomposition. In this NOx decomposition apparatus 10, exhaust gases including NOx are introduced to be hit onto the front surface of the gas decomposition apparatus 10 illustrated in FIG. 10(a). In the same manner, the exhaust gases are hit onto the gaps $3g$ or the naked regions $3g$ of the cathode 3, and the anodes 2. In the gas decomposition apparatus 10 of the embodiment, about NOx, a cathode reaction described below is generated in the naked regions $3g$ of the cathode to generate oxygen ions and nitrogen gas. The oxygen ions are sent from the cathode 3 to the solid electrolyte layers 1 while the nitrogen gas is discharged through the cathode naked regions $3g$ into the outside air. In each of the anodes 2, the oxygen ions, which have been shifted in the solid electrolyte layer 1 concerned, are bonded to each other, so that oxygen gas is generated and then discharged into the outside air. For this reason, it is important that as described above, the gaps $3g$ and the laminates (each made of the "solid electrolyte layer 1/anode 2") are alternately and densely distributed at a fine pitch on the cathode 3.

The thickness t1 of each of the solid electrolyte layers illustrated in FIGS. 10(b) and 10(c) is set usually to 20 μm or less. The thickness t1 is more preferably 10 μm or less, even more preferably 7.5 μm or less, for example, 5 μm. The matter that this thickness t1 is made small makes it possible to shorten the period when the oxygen ions generated in the cathode 3 reach the anodes 2, so as to result in a rise in the NOx decomposition rate. Alternately, in order to make the gas decomposition rate into a practical level, it is conceivable that when a burden is made light onto the heater or some other for heating or when the present apparatus is mounted onto an automobile or some other, waste heat is used and the heater or the other is removed. As disclosed in Patent Literature 3, as a conventional gas decomposition apparatus, suggested is a gas decomposition apparatus wherein a zirconia tube having an outside diameter of 10 mm and an inside diameter of 7 mm to have a thickness of 1.5 mm is used as a solid electrolyte layer to form a cathode on the internal surface of the zirconia tube and form an anode on the external surface within a predetermined scope from an end of the external surface. In this case, it is necessary that the oxygen ions diffuse in the region confined by the thickness of 1.5 mm (1500 μm) in the zirconia tube. Therefore, a voltage is applied to the zirconia tube, and further the gas decomposition apparatus is heated into the range of temperatures of 600° C. to 800° C., for example, 700° C. to be operated.

Figure 11:
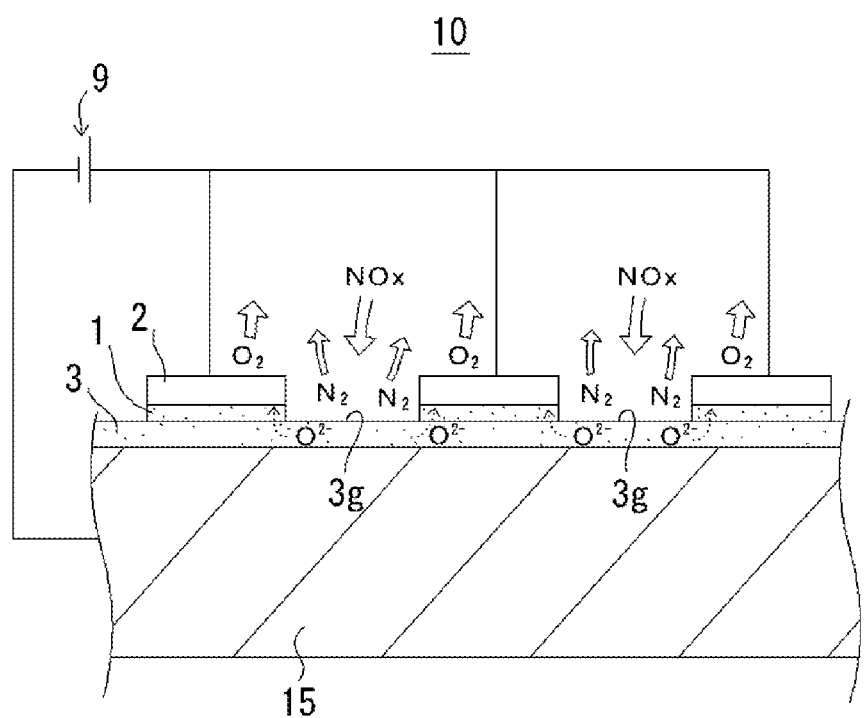
FIG. 11 is a view referred to in order to describe electrochemical reaction when an oxygen ion electroconductive solid electrolyte is used to decompose NOx.

FIG. 11 is a principle view that schematically shows the electrochemical reaction generated when the NOx decomposition apparatus 10 in the embodiment is used to decompose NOx. As described above, in the invention, the same exhaust gases are introduced to both of the anodes 2 and the cathode 3 without distinguishing these electrode species from each other. Most of the electrochemical reaction in the cathode is conducted in the gaps $3g$ or the naked regions $3g$ of the cathode 3. However, when the principle is described, description up to the "naked regions $3g$" is omitted for simplicity and clearness.

In the cathode 3, the following cathode reaction is generated: $2NO_2+8e^-\rightarrow N_2+4O^{2-}$, or $NO+2e^-\rightarrow(\frac{1}{2})N_2+O^{2-}$. The oxygen ions $O^{2-}$ generated in the cathode reaction pass through the solid electrolytes 1 contacting the cathode 3 to reach the respective anodes 2.

In the anode 2, a reaction of $O^{2-}+O^{2-}\rightarrow O_2+4e^-$ is generated. The electrons $e^-$ advance from the anode 2 via an external circuit to the cathode 3 so as to be associated with the above-mentioned cathode reaction.

In an automobile, about the power source for applying a voltage to the anode 2 and the cathode 3 across these electrodes, it is preferred that an appropriate voltage of 10 V to 20 V is applied by use of an auxiliary battery or some other. As described above, in the embodiment, a voltage drop in the cathode 3 is not caused over the plane direction thereof. Thus, the voltage of the power source 9 is applied, as it is, to the cathode 3 and the solid electrolyte layers 1 over the thickness direction thereof. Since the anodes 2 are good electroconductors, a voltage drop therein can be ignored. For this reason, even when a small voltage is applied, a large electric field can be generated in the cathode 3 and the solid electrolyte layers 1. The oxygen ions are improved in shift speed in the large electric field, so that the gas decomposition rate can be improved.

It is conceivable that in the above-mentioned chemical reaction, an effect peculiar to the invention is gained, which has not been verified by any demonstration experiment. Specifically, oxygen ions generated in the cathode 3 diffuse from the cathode naked regions $3g$ into the thickness direction of the solid electrolyte layers 1 to reach the respective anodes 2, so that oxygen gas is generated in the anodes 2. In this electrochemical reaction, about the diffusion of the oxygen ions from the cathode naked regions $3g$ through the solid electrolyte layers 1 to the anodes 2, most of the ions are shifted in the surface layer or outside layer. Since the cathode 3, the solid electrolyte layers 1 and the anodes 2 are produced through a sintering process, the outside layer, which contacts the mold (concerned), such as the metal mold, is higher in density than the inside although the outside layer is porous. Thus, it appears that the sectional area of paths for the shift of oxygen ions is increased so that the diffusion speed apparently becomes large. As a result, the operating temperature of the gas decomposition apparatus 10 can be rendered a low temperature.

Respective materials of the cathode 3, the anode 2, and the solid electrolyte 1 are not particularly limited. The materials may each be any material as far as the material is permitted to cause the above-mentioned electrochemical reaction. Respective materials of the cathode 3, the anode 2 and the solid electrolyte 1 that will be described hereinafter are mere examples.

—Cathode—

Figure 12:
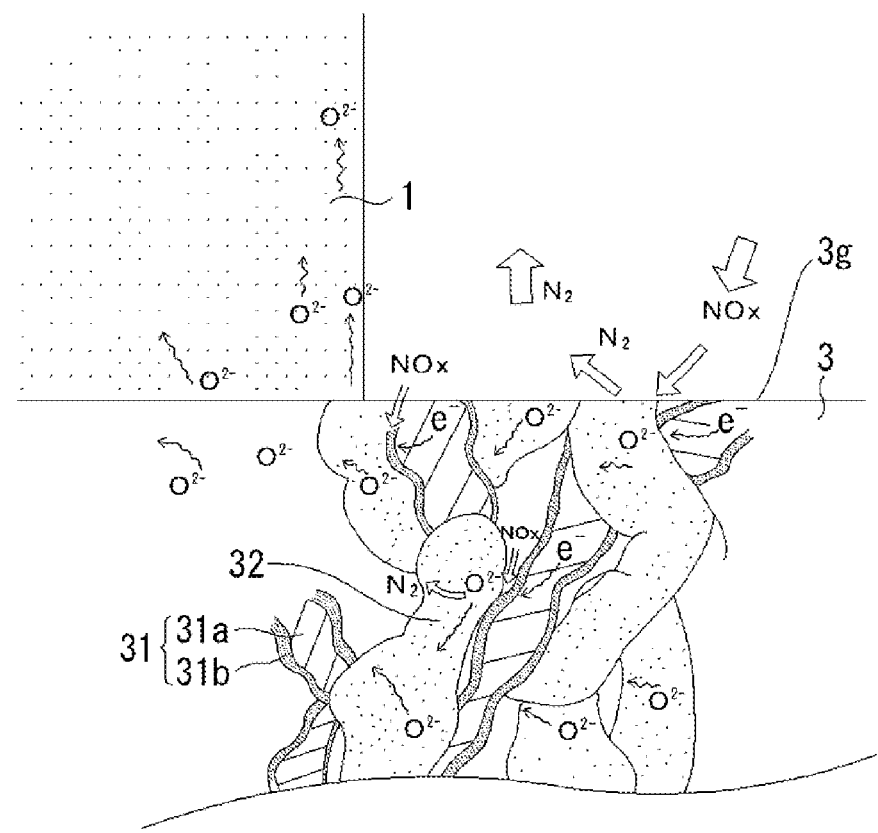
FIG. 12 is a view referred to in order to describe NOx decomposition reaction (cathode reaction) in a cathode in FIG. 11.

FIG. 12 is a view referred to in order to describe NOx decomposition reaction (cathode reaction) in the cathode 3. The cathode 3 is preferably a sintered body composed mainly of a Ni-particle-chained body 31 made of a metal 31a covered with a surface oxidized layer 31b, and an oxygen ion electroconductive ceramic 32. The oxygen ion electroconductive ceramic may be SSZ (scandium stabilized zirconia), YSZ (yttrium stabilized zirconia), SDC (samarium doped ceria), LSGM (lanthanum gallate), GDC (gadolinium doped ceria), or some other. By the addition of surface-oxidized metallic particles, in particular, the surface-oxidized metallic-particle-chained body (in a string or needle form) 31, catalytic effect can be increased and the cathode can be improved in electron conductivity, so that the cathode reaction can be promoted. An electroconductive portion (metallic portion covered with the oxidized layer) 31a of the metallic-particle-chained body 31, for improving the electron conductivity, may be made only of Ni, or may be made of Ni into which Fe, Ti or some other is incorporated.

The metal of the metallic-particle-chained body is preferably nickel (Ni). The metal may be a substance wherein Ni contains a small amount of iron (Fe). The metal is more preferably the substance containing Ti in a trace amount of about 2 to 10000 ppm. (1) Ni itself has a catalytic effect of promoting the decomposition of NOx. Moreover, the incorporation of Fe or Ti in a very small amount makes it possible to heighten the catalytic effect. Furthermore, a nickel oxide, which is formed by the oxidization of this metal Ni, makes it possible to make the promoting effect of this simple metal greatly higher. (2) The substance concerned has not only the catalytic effect but also an effect of causing electrons to participate in the decomposition reaction in the cathode. In other words, the decomposition is conducted in electrochemical reaction. In the above-mentioned cathode reaction, i.e., $NO+4e^- \rightarrow N_2+2O^{2-}$ and $2NO_2+8e^- \rightarrow N_2+4O^{2-}$, the contribution of electrons acts, so that the decomposition rate of NOx is largely improved. (3) For the cathode reaction, the shift of electrons $e^-$ is made smooth. Unless electrons $e^-$ are conducted to the cathode, the advance of the cathode reaction is hindered. The metallic-particle-chained body 31 is in a string or needle form to be slender, and the inside 31a thereof, which is covered with the oxidized layer 31b, is a highly electroconductive metal (Ni). Electrons $e^-$ flow smoothly in the longitudinal direction of the string-form metallic-particle-chained body. For this reason, it does not occur that the electrons $e^-$ are not conducted to the cathode 3. Thus, the electrons $e^-$ pass through the inside 31a of the metallic-particle-chained body 31 to flow thereinto. The existence of the metallic-particle-chained body 31 makes the flow of the electrons $e^-$ far smoother than the absence of the metallic-particle-chained body 31. However, the whole of the cathode 3 is high in electric resistance. When surface contact is realized between the electroconductor plate 15 and the cathode 3 as described above, power consumption based on others than the gas decomposition in the cathode 3 can be restrained, and further a large electric field can be produced in the cathode 3 and the solid electrolyte layers 1.

—Anode—

Figure 13:
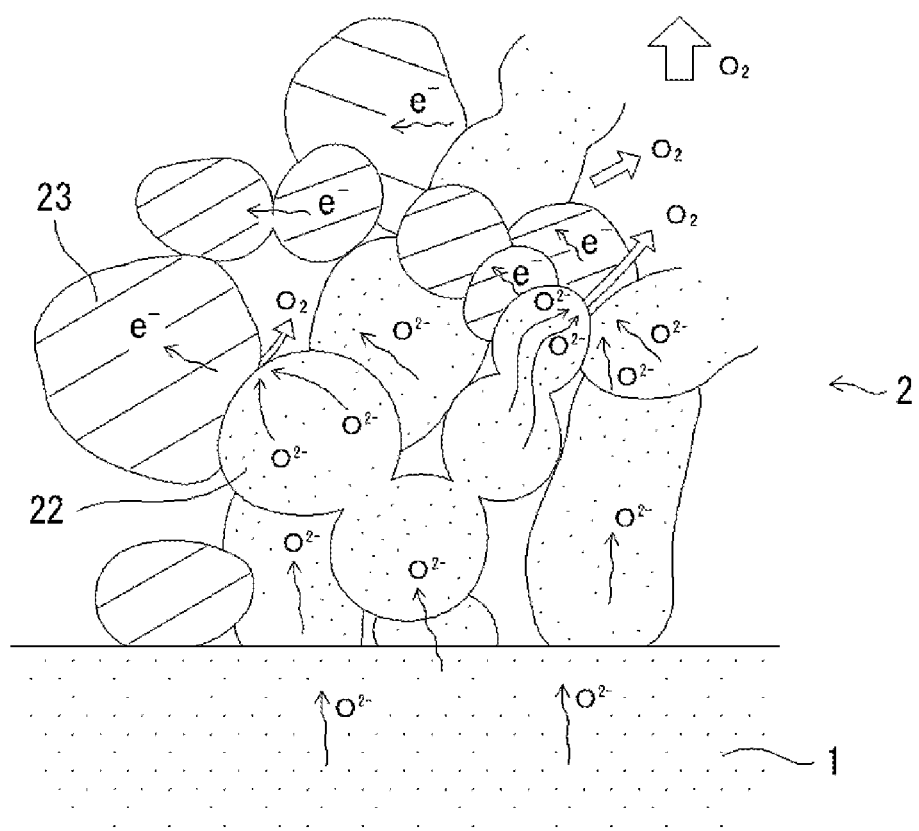
FIG. 13 is a view referred to in order to describe anode reaction in an anode in FIG. 11.

FIG. 13 is a view referred to in order to describe anode reaction in each of the anodes 2. The anode 2 is preferably a sintered body containing silver (catalyst) particles 23, and an oxygen ion electroconductive ceramic 22. The oxygen ion electroconductive ceramic 22 is preferably LSM (lanthanum strontium manganite), LSC (lanthanum strontium cobaltite), SSC (samarium strontium cobaltite), or some other.

—Solid Electrolyte—

The solid electrolyte 1 may be a solid oxide, a melted carbonate, phosphoric acid, a solid polymer, or some other that has oxygen ion electroconductivity. The solid oxide is preferred since the solid oxide can be made small in size, and is easily handleable. The solid electrolyte 1 is preferably SSZ, YSZ, SDC, LSGM, GDC, or some other.

—Production Process—

The materials which constitute the gas decomposition apparatus are commercially available except the metallic-particle-chained body. Commercially available products may be used. The electroconductive plate 15 may be, for example, a stainless steel plate. When the cathode 3 is formed by screen printing onto the electroconductor plate 15, it is advisable to set the thickness of the cathode 3 into the range of 10 μm to 20 μm. The thickness is in particular preferably a thickness of 5 μm to 20 μm. The solid electrolyte 1 may be, for example, a commercially available product of a thin plate made of YSZ. It is advisable to make the thickness of each of the solid electrolyte layers 1 as small as a value ranging from 2 μm to 20 μm. Each of the laminates (made of the "solid electrolyte layer 1/anode 2") is formed by screen printing on the cathode 3. It is advisable to set the thickness of the anodes into the range of 10 μm to 20 μm.

The solid electrolyte layers 1 and the anodes 2, which contain the above-mentioned components, respectively, are arranged on the cathode 3 by screen printing. The gaps 3g and the width w2 of the anodes 2 are set in such a manner that the above-mentioned fine pitch can be gained.

The average particle diameter of the silver particles 23 in the anode 2 is set into the range preferably from 10 nm to 100 nm. The average particle diameter of the oxygen ion electroconductive ceramic particles 22 and 23, for example, LSM or GDC is preferably from 0.5 μm to 50 μm. The blend ratio of the silver particles to LSM, or that of the metallic-particle-chained body 31 to the GDC 32 is set into the range preferably from about 0.01 to 10.

A binder resin, an organic solvent, and the above-mentioned particles are mixed with each other into a paste form, and the paste is screen-printed. After the screen printing, for example, the workpiece is kept at a temperature of 800° C. to 900° C. in a reducing atmosphere for about 30 minutes to 180 minutes. In this way, the workpiece is sintered.

After the sintering of the metallic plate 15/the cathode 3/the solid electrolyte layers 1/the anodes 2, and the insulating regions 18 made of alumina or some other, a gold (Au) paste is painted on the anodes 2 and the electroconductive plate 15, and then the workpiece is dried to form wiring between these members and the power source 9.

(Process for Producing the Metallic-Particle-Chained Body)

The process for producing the metallic-particle-chained body 31, and the method for the surface oxidizing treatment thereof are the same as in the first embodiment.

According to the NOx decomposition apparatus, the metallic plate 15 and the cathode 3 are stacked on each other to undergo surface contact, so that a voltage drop based on the electric resistance of the cathode is not generated in the flat surface direction and is restricted into the thickness direction. This matter makes it possible to restrain the electric power consumed in the cathode and form a large electric field concentrated into the cathode 3 and the solid electrolyte layers 1.

Moreover, the anodes 2 and the naked regions 3g of the cathode 3, for causing electrochemical reaction, can be arranged at a high density on the cathode 3 or the metallic plate 15. Thus, even when the temperature of the apparatus is not made higher than in the prior art, the gas decomposition rate can be improved so that the gas decomposition can be attained at a practical level.

Furthermore, for the solid electrolyte layer 1, which is brittle, there is generated a margin for making use of the rear surface or some other of the solid electrolyte layer 1 to reinforce the layer. In the present embodiment, by using the metallic plate 15 made of stainless steel to apply the reinforcement, through the cathode 3, to the rear surface or the other, the apparatus can be improved in impact resistance performance. The solid electrolyte 1, the anode 2, the cathode 3, and so on can be produced by screen printing, or the like. Thus, costs can be decreased.

In FIG. 10, the cathode area 3g, which is the area of each of the gap regions, is consistent with the area of each of the anodes 2 between which the gap 3g is sandwiched when the apparatus is viewed in plan. However, the area of each of the cathode gaps 3g may be made larger than the area of each of the anodes 2 between which the gap is sandwiched. By making the cathode 3 area larger than the anode 2 area, the NOx decomposition reaction can be promoted. In short, the used conditions can be made near to the optimal conditions for the decomposition efficiency.

(Two-Dimensional Shape of the Laminates Each Made of the "Solid Electrolyte Layer/Anode")

Figure 14:
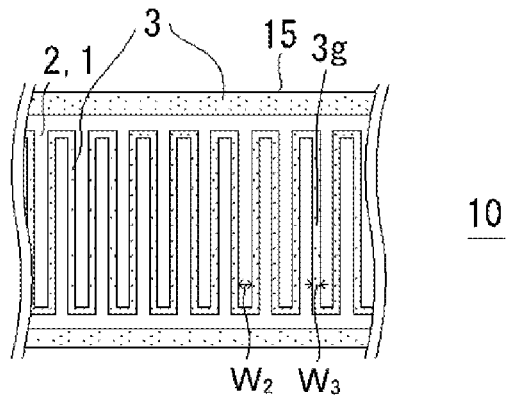
FIGS. 14(a) to 14(c) are each a plan view illustrating a modified example of the two-dimensional shape of laminates each composed of "a solid electrolyte layer/an anode" in a fifth embodiment of the invention.
Figure 14:
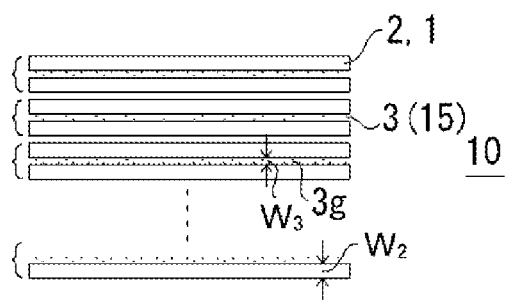
Figure 14:
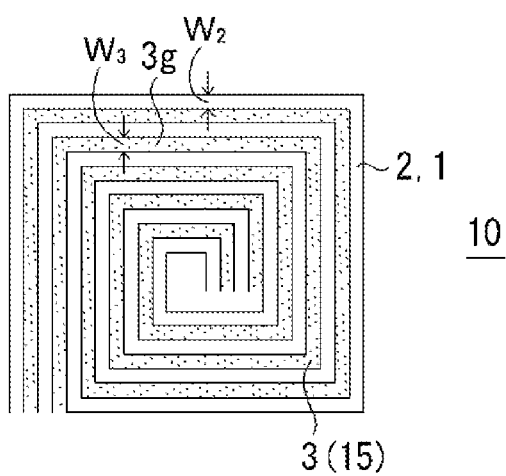

FIGS. 14(a) to 14(c), and FIG. 15 are each a view referred to in order to describe the two-dimensional shape of the laminates each made of the "solid electrolyte layer 1/anode 2" on the cathode 3. It is important that as described above, the laminates each made of the "solid electrolyte layer 1/anode 2", and the gaps 3g or naked regions 3g of cathode 3 are alternately and densely distributed at a fine pitch. As far as this requirement is satisfied, the two-dimensional shape may be any shape, and may be, for example, each of two-dimensional shapes as shown in FIGS. 14(a) to 14(c). In FIG. 14(a), the whole of the laminates each made of the "solid electrolyte layer 1/anode 2" is in the form of the so-called comb-teeth, and the whole of the gaps 3g is in a serpentine form. FIG. 14(b) shows that the laminates each made of the "solid electrolyte layer 1/anode 2" are in a form of two or more lines or bands parallel to each other. FIG. 14(c) shows a spiral form.

In a case where the two-dimensional shape of the laminates each made of the "solid electrolyte layer 1/anode 2" is a two-dimensional shape as each of FIGS. 14(a) to 14(c), the size w3 of the gaps 3g or naked regions 3g of the cathode 3, and the size w3 of the width of the anodes 2 can be gained by measurement in accordance with terms, as illustrated.

Figure 15A:
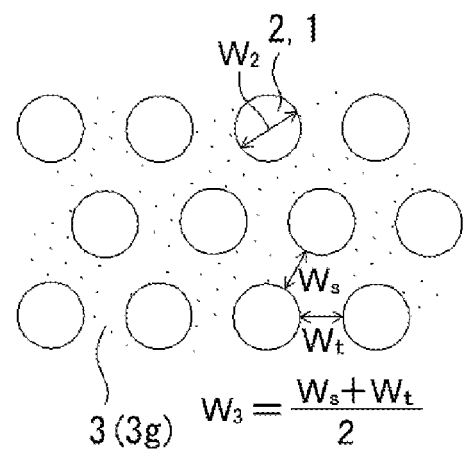
FIGS. 15(a) and 15(b) are each a plan view illustrating a modified example of the two-dimensional shape of the "solid electrolyte layer/anode" laminates in the fifth embodiment of the invention.
Figure 15B:
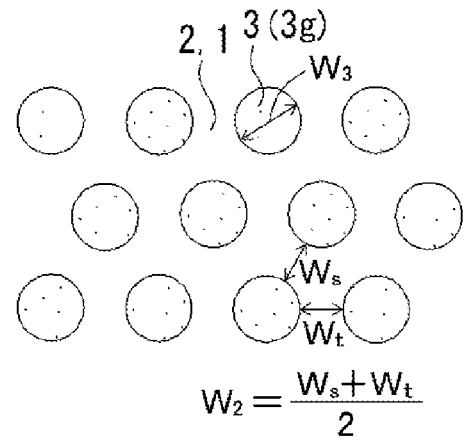

FIG. 15(a) illustrates a form that the laminates each made of the "solid electrolyte layer 1/anode 2" are distributed in a patch form on the cathode 3. FIG. 15(b) illustrates a reverse form that the gaps 3g between the laminates each made of the "solid electrolyte layer 1/anode 2" are distributed in a patch form. In the case illustrated in each of FIGS. 15(a) and 15(b), by distributing the patch regions of the gaps 3g densely at a fine pitch, the apparatus concerned can obtain the same effects and advantages as the gas decomposition apparatus 10 illustrated in FIG. 10, or FIGS. 14(a) to 14(c). The meaning of the gaps 3g is enlarged, whereby finite regions, such as patch-form regions, are also defined as one example of the gaps 3g.

In the case illustrated in FIG. 15(a), the width w2 of the laminates each made of the "solid electrolyte layer 1/anode 2" is made equal to the diameter of the patches. When the patch-form regions are not circular, the respective crossing-diameters along directions are averaged. When the patches are unequal in size, the sizes of the unequal patches are averaged. As illustrated in FIG. 15(a), about the gaps 3g, the respective intervals between individual adjacent two of the patches are averaged. The resultant value is the size w3 of the gaps 3g.

In the case illustrated in FIG. 15(b), the gaps or the naked regions 3g of the cathode 3 are in the form of patches. Thus, the average of the diameters or crossing-diameters of the patches is defined as the size of the gaps 3g. The average of the respective intervals between individual adjacent two of the patches becomes equal to the size (of the width) of the laminates each made of the "solid electrolyte layer 1/anode 2".

Modified Examples of Fifth Embodiment

Figure 16A:
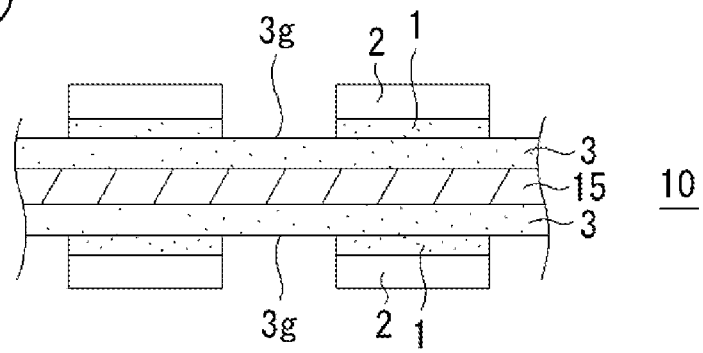
FIGS. 16(a) to 16(c) each illustrate a modified example of the fifth embodiment of the invention.
Figure 16B:
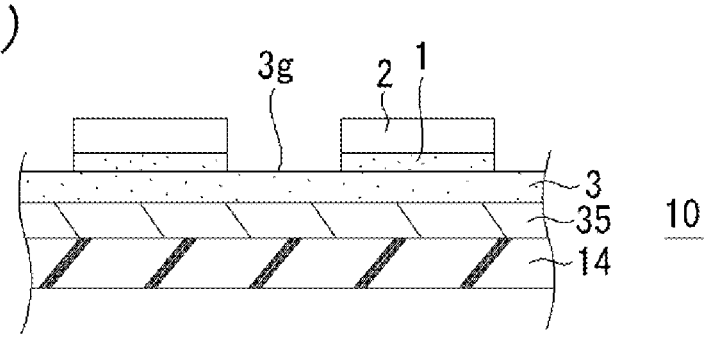
Figure 16C:
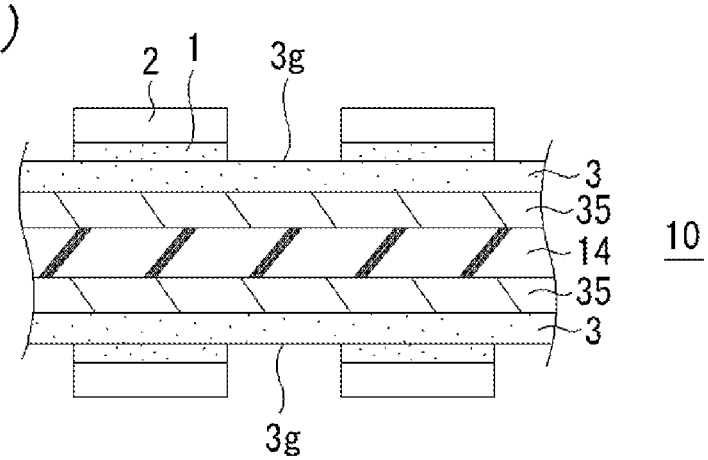

FIGS. 16(a) to 16(c) are each a modified example of the fifth embodiment, and each a gas decomposition apparatus of an example of the embodiment of the invention. The gas decomposition apparatuses 10 illustrated in FIGS. 16(a) to 16(c) basically have the same structure as the gas decomposition apparatus illustrated in FIG. 10. However, each of the apparatuses has the following originality:

Gas Decomposition Apparatus in FIG. 16(a):

A cathode 3 is laminated on each of the front surface and the rear surface of a electroconductor plate, or a metallic plate 15 made of stainless steel or some other, and laminates each made of a solid electrolyte layer 1 and an anode 2 are arranged to have a gap 3g between any adjacent two of the laminates. This manner makes it possible to overcome the brittleness of the solid electrolyte layers 1, the cathodes 3, the anodes 2, and others, which is a large drawback of these members, and simultaneously promote the downsizing of the gas decomposition apparatus. The use efficiency of a space for the arrangement of the gas decomposition apparatus can be made high.

Gas Decomposition Apparatuses 10 in FIG. 16(b) and FIG. 16(c):

In the gas decomposition apparatus in FIG. 16(b), an electroconductor layer 35 is formed on a surface of an insulating substrate 14, and a cathode 3 is formed into a layer form on the formed electroconductor layer 35. On the cathode 3 are arranged laminates each made of a solid electrolyte layer 1 and an anode 2 to have a gap 3g between any adjacent two of the laminates. The insulating substrate 14 may be, for example, an aluminum substrate. The electroconductor layer 35 may be, for example, a metallic film, and may be formed, as a film, by any film-forming method such as sputtering, or laser ablation. This manner makes it possible to make the apparatus light without using any electroconductor plate or metallic plate and simultaneously overcome the brittleness of the solid electrolyte layers 1, the cathode 3, the anodes 2, and others, which is a large drawback thereof.

In the gas decomposition apparatus 10 in FIG. 16(c), electroconductor layers 35 are laid on both surfaces of the insulating substrate 14 in FIG. 16(b), respectively. On each of the surfaces are arranged a cathode 3, and plural laminates each made of a solid electrolyte layer 1 and an anode 2, so as to have a gap 3g between any adjacent two of the laminates. This manner makes it possible to make the apparatus light, and simultaneously promote the downsizing of the gas decomposition apparatus, and overcome the brittleness of the solid electrolyte layers 1, the cathodes 3, the anodes 2, and others, which is a large drawback thereof.

Sixth Embodiment

Figure 17A:
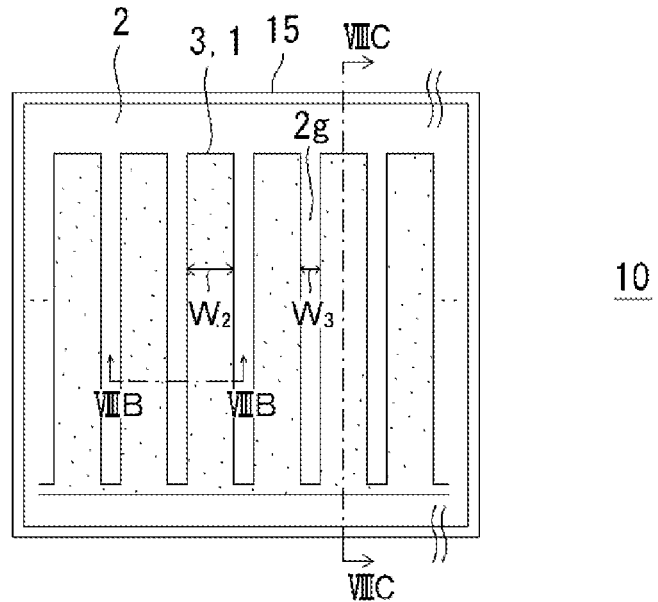
FIGS. 17(a) to 17(c) illustrate a gas decomposition apparatus in a sixth embodiment of the invention.
Figure 17B:
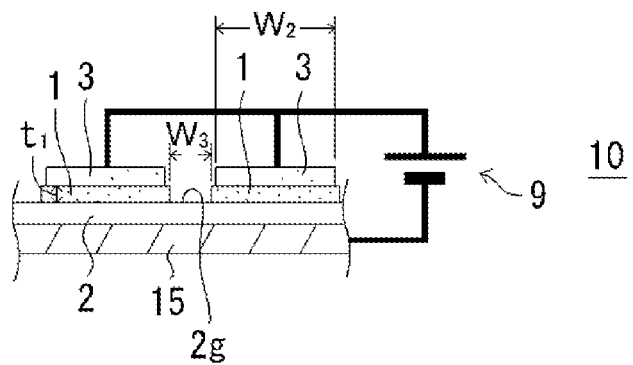
Figure 17C:
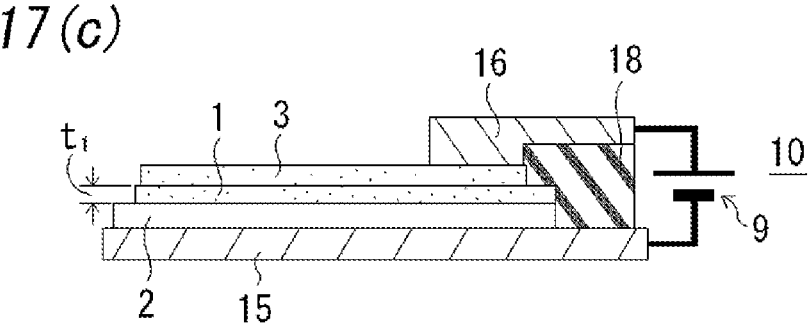

FIG. 17(a) is a plan view illustrating a NOx decomposition apparatus 10 that is a gas decomposition apparatus in a sixth embodiment of the invention; FIG. 17(b) is a sectional view thereof that is taken along line VIIIB-VIIIB; and FIG. 17(c) is a sectional view thereof that is taken along line VIIIC-VIIIC. In this NOx decomposition apparatus 10, its second electrode is an anode 2, and its first electrodes, which are higher in electric resistance than the second electrode, are cathodes 3. The anode (second electrode) 2 is laminated on a electroconductor plate 15, which is a electroconductor layer, and laminates each composed of a solid electrolyte layer 1 and one of the cathodes (second electrodes) 3 are arranged to contact the anode 2 and have a gap 2g having a size of w3 between any adjacent two of the laminates.

Characteristics of the present embodiment are the following two points:

(1) A laminate composed of the electroconductor plate 15/the anode 2/the solid electrolyte layers 1/the cathodes 3.

(2) The cathodes 3 are larger in area than the anode 2. The area referred to herein denotes, when the laminate is viewed in plan, the area of a viewable portion thereof, and does not include any hidden portion. In other words, the area is the second electrode area (anode 2, or 2g) inside the gap regions, or the area of the first electrodes (cathodes 3) that are respective regions between which the gaps 2g are sandwiched.

The respective sizes w3 of the gaps 2g do not need to be constant. It is one of the points of the embodiment that the sizes w3 are each made as small as a value of about 2 μm to 1 mm, and the respective widths w2 of the laminates (each made of the "solid electrolyte layer 1/cathode 3") are each made near to each of the sizes w2 so as to be as small as a value of 2 μm to 1 mm. In other words, it is important that the gaps 2g and the laminates (each made of the "solid electrolyte layer 1/cathode 3") are alternately and densely distributed at a fine pitch on the anode 2.

By making the cathodes 3 larger in area than the anode 2 as described above, NOx decomposition reaction can be promoted. That is, for the NOx decomposition efficiency, conditions for the NOx decomposition can be made still nearer to the optimal conditions. Moreover, the cathodes 3 are positioned as upper layers. Thus, the contact thereof with NOx can be made good so that NOx decomposition can be promoted.

Seventh Embodiment

Figure 18:
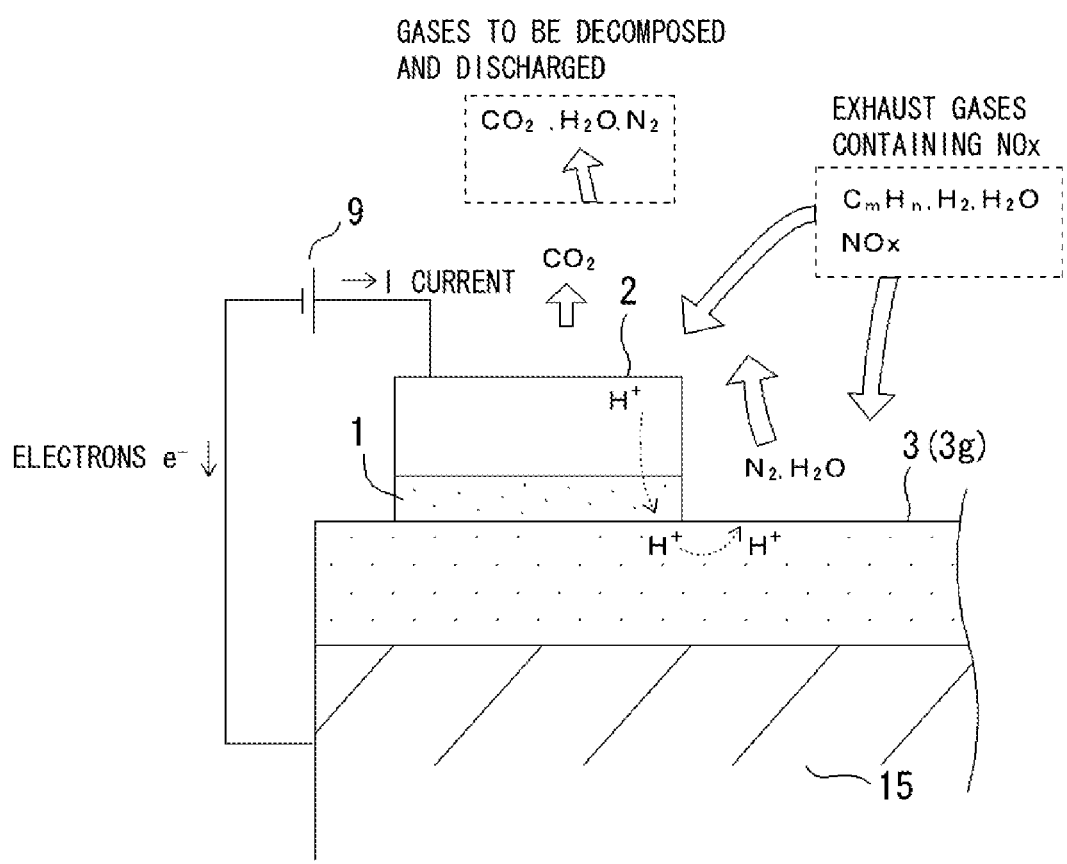
FIG. 18 is a view referred to in order to describe a principle of a gas decomposition apparatus in a seventh embodiment of the invention.

FIG. 18 is a view referred to in order to describe a principle of a gas decomposition apparatus in a seventh embodiment of the invention. The gas decomposition apparatus in the seventh embodiment, which is an apparatus 10, basically has the same form as the gas decomposition apparatus 10 illustrated in FIG. 10, FIG. 14 or 15, or FIG. 16. In the seventh embodiment, about the content of material, the oxygen ion shifting material in the fifth embodiment is changed to a proton shifting material. Exhaust gases from automobiles include not only NOx but also hydrocarbons (CmHn), hydrogen ($H_2$), water vapor ($H_2O$) and others. In the exhaust gases is put the gas decomposition apparatus 10 having the layout illustrated in FIG. 10, FIG. 14 or 15, or FIG. 16, and made of a material corresponding to the shift of protons. In its anode 2 and cathode 3, reactions are as follows:

"Anode reaction": proton ($H^+$) supplying reaction advances according to the following (A1) and/or (A2):

$$H_2 \rightarrow 2H^+ + 2e^- \quad (A1)$$

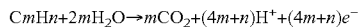
$$CmHn + 2mH_2O \rightarrow mCO_2 + (4m+n)H^+ + (4m+n)e^-$$

"Cathode Reaction":

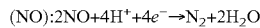
$$(NO): 2NO + 4H^+ + 4e^- \rightarrow N_2 + 2H_2O$$

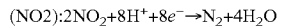
$$(NO2): 2NO_2 + 8H^+ + 8e^- \rightarrow N_2 + 4H_2O$$

In the present embodiment, a solid electrolyte layer 1 is made of a proton electroconductor. The proton electroconductive material may be, for example, $CsHSO_4$, or $BaZrO_3$.

The anode 2 is made of, for example, Ag particles, and proton electroconductive ceramic particles of $CsHSO_4$ or $BaZrO_3$. The cathode(s) 3 is/are made of, for example, a surface-oxidized material of a Ni-particle-chained body, proton electroconductive ceramic particles of $CsHSO_4$ or $BaZrO_3$, and a noble metal such as Pt or Rh.

In the embodiment also, the anode 2 is low in electric resistance since the anode 2 contains the Ag particles. The cathode 3 is relatively high in electric resistance since the core of the surface-oxidized material of the Ni-particle-chained body is an electroconductive material but has been surface-oxidized. For this reason, the gas decomposition apparatus 10 of the present embodiment, wherein proton shift is used, is identical with the fifth embodiment in that cathode(s) 3 is/are relatively high in electric resistance. Thus, the effects and advantages of the electroconductive plate 15/the cathode(s) 3" that have been described with reference to FIG. 10 and so on are true, as they are, in the gas decomposition apparatus of the present embodiment also. Furthermore, as has been illustrated in FIG. 17 (sixth embodiment), it is allowable to laminate an anode 2 onto an electroconductor plate 15, and then arrange laminates each made of a solid electrolyte layer 1 and a cathode 3 on the anode 2, whereby the cathodes 3 are made larger in area than the anode 2, the area having the above-mentioned meaning. In other words, the solid electrolyte and so on in the NOx decomposition apparatus illustrated in FIGS. 17(a) to 17(c) may be replaced by ones for proton conduction, as described above.

In the embodiment, proton shift is used, so that the proton shift speed is higher than the oxygen ion shift speed; thus, the following and other advantages can be obtained: the gas decomposition apparatus can be made low in operating temperature; and according to comparison at the same operating temperature, the gas decomposition apparatus can be larger in gas decomposition rate.

Eighth Embodiment

Figure 19:
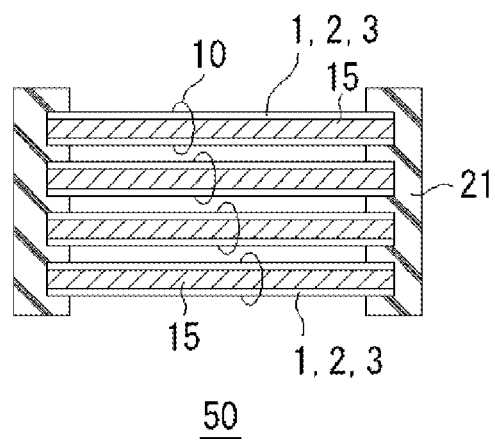
FIG. 19 is a view illustrating a gas decomposition apparatus (plural-laminate structure) in an eighth embodiment of the invention.

FIG. 19 is a view illustrating a gas decomposition apparatus 50 in an eighth embodiment of the invention. In this gas decomposition apparatus, the NOx decomposition apparatus 10 of the fifth embodiment, each of the modified examples thereof, the sixth embodiment or the seventh embodiment is arranged on each surface of an electroconductive plate 15. Moreover, this plate 15, and one or more electroconductor plates identical therewith are stacked onto each other by a laminate supporting member 21. On each surface of each of the plates 15, one or more cathodes 3, solid electrolyte layers 1 and one or more anodes 2 are arranged. Of course, the present embodiment is identical with the fifth embodiment, the modified examples thereof, the sixth embodiment and the seventh embodiment in that the following: the cathode 3 or the anode 2 is laminated on each of the electroconductive plates 15; and thereon are arranged laminates each made of one of the solid electrolyte layer 1 and one of the anodes 2 or the cathodes 3 are densely arranged at a fine pitch, so as to have a gap 3g or 2g between any adjacent two of the laminates.

In this manner, the NOx decomposition apparatuses 10 are stacked over each other to have a space between any adjacent two thereof, thereby making it possible to decompose a large volume of NOx in a short period. Thus, the present apparatus 50 can be used to decompose NOx in exhaust gases from a diesel engine. The present embodiment can gain the advantages of the fifth embodiment, each of the modified examples, the sixth embodiment or the seventh embodiment. Specifically, the embodiment can be improved in endurance and gas decomposition rate, and can attain a restraint of power consumption. As a result, the gas decomposition can be attained at a practical level. In particular, for the solid electrolytes, which are brittle, there is generated a margin for making use of the rear surfaces or others of the electrolytes to reinforce the electrolytes. Thus, by applying the reinforcement to the rear surfaces or the others, the present apparatus can be improved in impact resistance performance. Additionally, the solid electrolyte, the anode, the cathode, and so on can be produced by screen printing. Thus, costs can be decreased.

The embodiments of the invention disclosed above are mere examples, and the scope of the invention is not limited to these embodiments of the invention. The scope of the invention is specified by the recitations of the claims. Additionally, the invention includes all modifications having meanings and scopes equivalent to the recitations of the claims.

INDUSTRIAL APPLICABILITY

According to the invention, in an apparatus wherein electrochemical reaction is used to decompose a predetermined gas, power consumption can be prevented in its solid electrodes, in particular, its cathode. Moreover, the gas decomposition rate can be improved. In predetermined cases, the invention can gain a gas decomposition apparatus capable of overcoming a low ion shift speed on the solid electrolyte, mechanical brittleness, and relatively high production costs. When the apparatus is mounted onto an automobile or some other and waste heat therefrom is used, the burden of a heater therein can be relieved or lost.

According to the invention, in an apparatus wherein electrochemical reaction is used to decompose a predetermined gas, power consumption can be revolutionarily restrained in its solid electrodes, in particular, its cathode. Moreover, a large electric field can be applied to the cathode/the solid electrolyte layer; thus, the apparatus can be improved in gas decomposition rate. In predetermined cases, the invention can gain a gas decomposition apparatus capable of overcoming a low ion shift speed on the solid electrolyte, mechanical brittleness, and relatively high production costs. When the apparatus is mounted onto an automobile or some other and waste heat therefrom is used, the burden of a heater therein can be relieved or lost.

REFERENCE SIGNS LIST

1: SOLID ELECTROLYTE 1g: GAP BETWEEN ANODE AND CATHODE
2: ANODE 2b: ANODE ROOT REGION 2e: ANODE EXTENDED REGIONS 2g: ANODE NAKED REGIONS (GAPS)
3: CATHODE 3b: CATHODE ROOT REGION 3e: CATHODE EXTENDED REGIONS 3g: CATHODE NAKED REGIONS (GAPS)
9: POWER SOURCE 10: GAS DECOMPOSITION APPARATUS 12: ANODE ELECTROCONDUCTIVE REGION 13: CATHODE ELECTROCONDUCTIVE REGION
14: INSULATING SUBSTRATE 15: ELECTROCONDUCTIVE PLATE 16: GOLD PASTE 18: INSULATING LAYER (SUCH AS ALUMINA)
21: LAMINATE SUPPORTING MEMBER 22: OXYGEN ION ELECTROCONDUCTIVE CERAMIC 23: SILVER PARTICLES
31: OXIDIZED-LAYER-ATTACHED Ni-PARTICLE-CHAINED BODY 31a: Ni-PARTICLE-CHAINED BODY 31b: OXIDIZED LAYER
32: OXYGEN ION ELECTROCONDUCTIVE CERAMIC 50: STACKED-STRUCTURE GAS DECOMPOSITION APPARATUS
d: SIZE OF GAP t1: THICKNESS OF SOLID ELECTROLYTE LAYER w2: WIDTH OF ANODE
w3: SIZE OF CATHODE NAKED REGIONS (GAPS)

The invention claimed is:

1. A gas decomposition apparatus, comprising first electrodes, a second electrode, solid electrolyte layers, and a power source for applying a voltage to the first electrodes and the second electrode across the first and second electrodes, the apparatus further comprising an electroconductor layer through which a negative electrode of the power source is electroconductively connected to the second electrode, wherein: the second electrode is laminated onto the electroconductor layer to contact the electroconductor layer;
laminates of "solid electrolyte layer/first electrode" that are each composed of one of the solid electrolyte layers and one of the first electrodes are positioned on the second electrode to contact the second electrode to have a gap between any adjacent two of the laminates; and
the first electrodes are electroconductively connected to a positive electrode of the power source.

2. The gas decomposition apparatus according to claim 1, wherein: the second electrode is a cathode; the cathode is laminated on the electroconductor layer to contact the layer; and the laminates which are laminates of "solid electrolyte layer/anode" each composed of one of the solid electrolyte layers and an anode are positioned on the cathode to contact the cathode, and have a gap between any adjacent two of the laminates.

3. The gas decomposition apparatus according to claim 1, wherein: the second electrode is an anode; the anode is laminated on the electroconductor layer to contact the layer; and the laminates which are laminates of "solid electrolyte layer/cathode" each composed of one of the solid electrolyte layers and a cathode are positioned on the anode to contact the anode, and have a gap between any adjacent two of the laminates.

4. The gas decomposition apparatus according to claim 1, wherein the cathode(s) is/are larger in area than the anode(s).

5. The gas decomposition apparatus according to claim 1, wherein the respective gaps between the "solid electrolyte layer/first electrode" laminates, and the respective widths of the "solid electrolyte layer/first electrode" laminates each range from 2 μm to 1 mm.

6. The gas decomposition apparatus according to claim 1, wherein the respective thicknesses of the solid electrolyte layers are each 20 μm or less.

7. The gas decomposition apparatus according to claim 1, wherein the "solid electrolyte layer/first electrode" laminates are, when viewed in plan, in at least one form selected from the following: (1) a form that two or more lines or bands are parallel to each other; (2) a comb-tooth form; (3) a spiral form; (4) a dot or patch form; and (5) a region surrounding dot-form or patch-form regions (a complementary-set region of dot-form or patch-form regions).

8. The gas decomposition apparatus according to claim 1, wherein the electroconductor layer is a metallic plate, or an electroconductor layer formed over an insulating substrate.

9. The gas decomposition apparatus according to claim 8, wherein the second electrode is laminated over the electroconductor layer laid over each of the front surface and the rear surface of the metallic plate or over each of the front surface and the rear surface of the insulating substrate, and further the "solid electrolyte layer/first electrode" laminates are positioned over the second electrode at each of the front surface side and the rear surface side.

10. The gas decomposition apparatus according to claim 1, wherein the solid electrolyte layer is oxygen ion electroconductive, and the second electrode comprises an oxide of a metallic-particle-chained body, GDC (gadolinium doped ceria), and $BaCO_3$.

11. The gas decomposition apparatus according to claim 1, wherein the solid electrolyte layer(s) is/are proton electroconductive, and the second electrode(s) comprise(s) an oxide of a metallic-particle-chained body, a noble metal, and a proton electroconductive material.

12. A gas decomposition apparatus, wherein plural gas decomposition apparatuses each as recited in claim 1 are stacked over each other to have a gap between any adjacent two of the apparatuses, and the apparatuses are fixed in a chassis.

13. A gas decomposition apparatus as recited in claim 1, which is mounted on an automobile, and has a heating mechanism for heating the gas decomposition apparatus by waste heat from the automobile.

* * * * *